(12) United States Patent
Yagi

(10) Patent No.: US 8,651,669 B2
(45) Date of Patent: Feb. 18, 2014

(54) PROJECTION APPARATUS THAT PROPERLY REDUCES FLICKER

(75) Inventor: Masaya Yagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 13/113,871

(22) Filed: May 23, 2011

(65) Prior Publication Data

US 2011/0292307 A1 Dec. 1, 2011

(30) Foreign Application Priority Data

May 26, 2010 (JP) ................ 2010-120894

(51) Int. Cl.
*G03B 21/00* (2006.01)
*G03B 21/14* (2006.01)
*G03B 21/26* (2006.01)
*G02F 1/1335* (2006.01)

(52) U.S. Cl.
USPC .......... 353/69; 353/31; 353/34; 353/82; 353/94; 349/8

(58) Field of Classification Search
USPC ......... 353/30–31, 33–34, 49, 69, 82, 94, 122; 349/5, 8
See application file for complete search history.

(56) References Cited

U.S. PATENT DOCUMENTS

| 5,738,429 | A  | * | 4/1998  | Tagawa et al. .......... 353/122 |
| 6,072,458 | A  | * | 6/2000  | Asakawa et al. ......... 345/101 |
| 7,119,492 | B2 | * | 10/2006 | Kuroda ................... 315/134 |
| 8,373,692 | B2 | * | 2/2013  | Uchiyama et al. ........ 345/207 |
| 2007/0120806 | A1 | * | 5/2007 | Schmidt et al. .......... 345/102 |
| 2009/0179882 | A1 | * | 7/2009 | Uchiyama et al. ........ 345/207 |
| 2009/0195881 | A1 | * | 8/2009 | Fuse ...................... 359/634 |
| 2009/0237624 | A1 | * | 9/2009 | Soma et al. .............. 353/85 |
| 2010/0321353 | A1 | * | 12/2010 | Bae et al. ............... 345/205 |
| 2011/0026038 | A1 | * | 2/2011 | Kiyose .................... 356/614 |

FOREIGN PATENT DOCUMENTS

| JP | 2002-091391 A | 3/2002 |
| JP | 2005-037455 A | 2/2005 |
| JP | 2008-152108 A | 7/2008 |
| JP | 2009-193044 A | 8/2009 |

OTHER PUBLICATIONS

Japanese Office Action issued in corresponding application No. 2010-120894 on Nov. 26, 2013.

* cited by examiner

*Primary Examiner* — Tony Ko
*Assistant Examiner* — Jori S Reilly-Diakun
(74) *Attorney, Agent, or Firm* — Carter, DeLuca, Farrell & Schmidt LLP

(57) ABSTRACT

A projection apparatus that provides flicker reduction according to the cause of flicker, to thereby properly reduce flicker without unnecessarily bringing about characteristic degradation is disclosed. Light for projecting a projection image onto a projection surface is output from a light source, and separated into light beams of a plurality of colors. Images corresponding to the light beams of the plurality of colors are formed on display units. The light beams of the plurality of colors having passed through the display units are synthesized and projected onto the projection surface. Fluctuations in the light quantity of the light beams of the plurality of colors having passed through the display units and yet to be input to the color synthesis unit are detected. Detection results are analyzed, and it is determined whether flicker caused by the display units or flicker caused by the light source is occurring in the projection image.

14 Claims, 14 Drawing Sheets

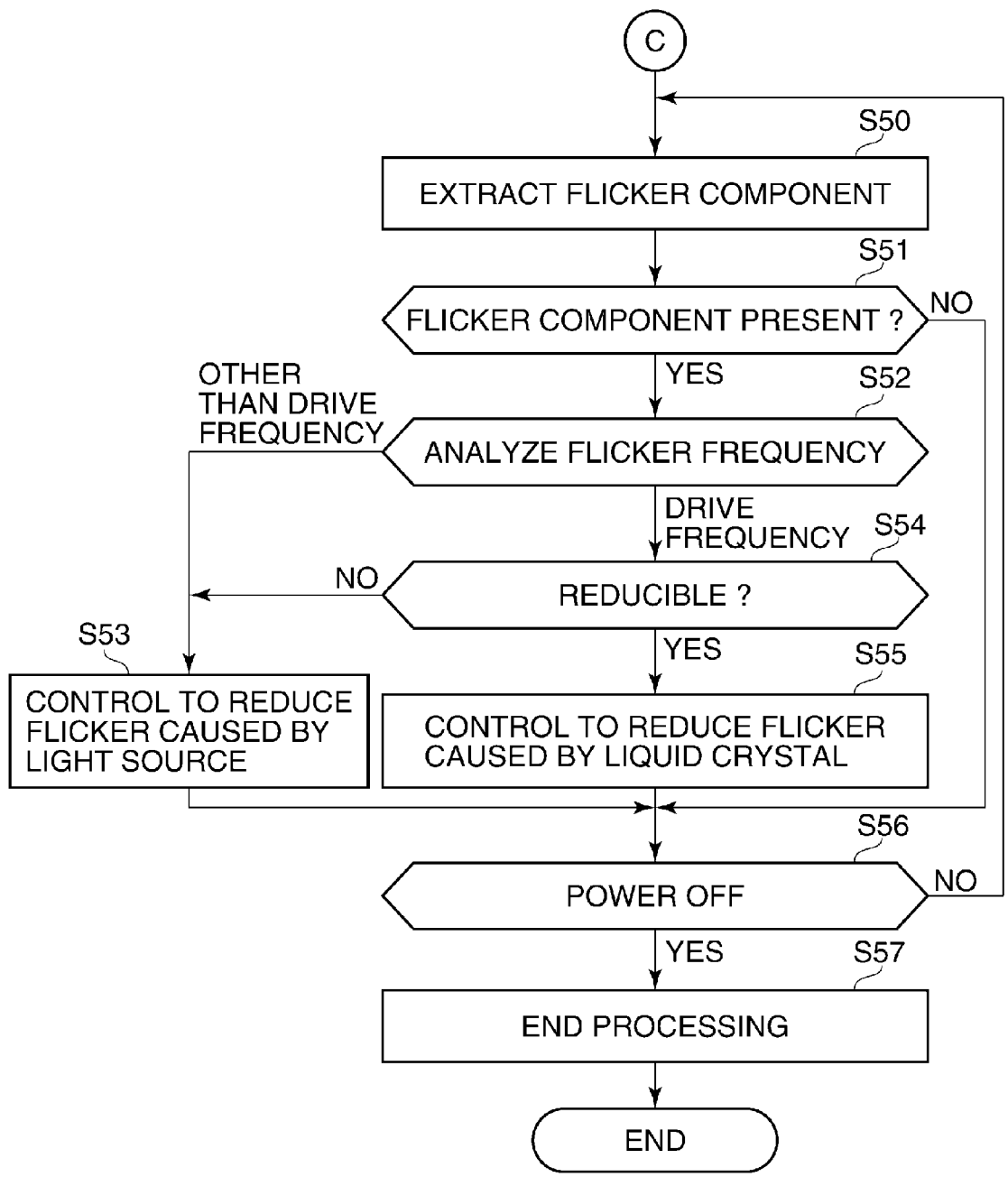

PROJECTION APPARATUS THAT PROPERLY REDUCES FLICKER

BACKGROUND OF THE INVENTION

1. Field of the Invention

The present invention relates to a projection apparatus.

2. Description of the Related Art

Conventionally, as a projection apparatus, there has been known an apparatus that projects, onto a screen, an image generated by a liquid crystal display element. This type of projection apparatus generally has a light source and a liquid crystal display element, and flicker occurs in each of them.

For example, the light source causes continuous flicker in a projection image due to temperature change, electrode form change, or fluctuation in voltage applied to the light source. To cope with this, Japanese Laid-Open Patent Publication (Kokai) No. 2005-037455 presents the technique that when a fluctuation in the light quantity of the light source is detected, electrical power of the light source is increased step by step, and after a fluctuation in the light quantity of the light source becomes undetected, electrical power of the light source is decreased step by step toward an initial value of light source electrical power. There has been known another method which adjusts an aperture of the light source.

As a means to reduce flicker caused by the liquid crystal display element, there has been known a method that an opposing electrode voltage Vcom applied to a common electrode opposed to pixel electrodes is adjusted in a final stage or the like of a manufacturing process. However, during actual operations, flicker occurs due to instability of the opposing electrode voltage Vcom in an early stage of the activation of the liquid crystal display element, deviation of the central pixel potential caused by signal waveform distortion in the liquid crystal display element, or the like (for example, Japanese Laid-Open Patent Publication (Kokai) No. 2002-091391).

There has been another method which reduces flicker by controlling the quantity of light in a luminance modulation liquid crystal display element.

In the conventional methods, flicker caused by the light source is reduced using a flicker reduction means of the liquid crystal display element, or flicker caused by the liquid crystal display element is reduced using a flicker reduction means of a light source drive unit.

However, because the luminance modulation liquid crystal display element reduces flicker by reducing contrast, it produces no effect of reducing flicker caused by the light source. Also, flicker control through adjustment of the liquid-crystal opposing electrode voltage Vcom produces no effect of reducing flicker caused by the light source.

The method that reduces flicker caused by the light source by adjusting light beams output from the light source using an aperture or by adjusting light source drive electrical power cannot cope with flicker occurring asynchronously in a plurality of liquid crystal display elements. This method also has the disadvantage that adjustments are made by lowering luminance although the problem does not lie in the light source.

SUMMARY OF THE INVENTION

The present invention provides a projection apparatus that provides flicker reduction according to the cause of flicker, to thereby properly reduce flicker without unnecessarily bringing about characteristic degradation.

According to a first aspect of the present invention, there is provided a projection apparatus that displays a projection image on a projection surface, comprising a light source unit configured to output light for projecting the projection image, a color separation unit configured to separate the light output from the light source unit into light beams of a plurality of colors, a plurality of display units configured to form images corresponding to the light beams of the plurality of colors, a color synthesis unit configured to synthesize the light beams of the plurality of colors having passed through the plurality of display units, a projection unit configured to project light obtained through synthesis by the color synthesis unit onto the projection surface, a plurality of detection units configured to detect fluctuations in light quantity of the light beams of the plurality of colors having passed through the plurality of display units and yet to be input to the color synthesis unit, and a determination unit configured to analyze detection results obtained by the plurality of detection units, and determine whether flicker caused by the plurality of display units or flicker caused by the light source unit is occurring in the projection image.

According to a second aspect of the present invention, there is provided a projection apparatus that displays a projection image on a projection surface, comprising a light source unit configured to output light for projecting the projection image, a color separation unit configured to separate the light output from the light source unit into light beams of a plurality of colors, a plurality of display units configured to form images corresponding to the light beams of the plurality of colors, a color synthesis unit configured to synthesize the light beams of the plurality of colors having passed through the plurality of display units, a projection unit configured to project light obtained through synthesis by the color synthesis unit onto the projection surface, a plurality of detection units configured to detect fluctuations in light quantity of the light beams of the plurality of colors having passed through the plurality of display units and yet to be input to the color synthesis unit, and a reduction unit configured to analyze detection results obtained by the plurality of detection units, and reduce flicker caused by the plurality of display units or flicker caused by the light source unit, which is occurring in the projection image.

According to a third aspect of the present invention, there is provided a projection apparatus that displays a projection image on a projection surface, comprising a light source unit configured to output light for projecting the projection image, a color separation unit configured to separate the light output from the light source unit into light beams of a plurality of colors, a plurality of display units configured to form images corresponding to the light beams of the plurality of colors, a color synthesis unit configured to synthesize the light beams of the plurality of colors having passed through the plurality of display units, a projection unit configured to project light obtained through synthesis by the color synthesis unit onto the projection surface, a detection unit configured to detect a fluctuation in light quantity of the light having passed through the color synthesis unit, and a determination unit configured to analyze a detection result obtained by the detection unit, and determine whether flicker caused by the plurality of display units or flicker caused by the light source unit is occurring in the projection image.

According to a fourth aspect of the present invention, there is provided a projection apparatus that displays a projection image on a projection surface, comprising a light source unit configured to output light for projecting the projection image, a color separation unit configured to separate the light output from the light source unit into light beams of a plurality of colors, a plurality of display units configured to form images corresponding to the light beams of the plurality of colors, a color synthesis unit configured to synthesize the light beams of the plurality of colors having passed through the plurality of display units, a projection unit configured to project light obtained through synthesis by the color synthesis unit onto the projection surface, a detection unit configured to detect a fluctuation in light quantity of the light having passed through the color synthesis unit, and a reduction unit configured to analyze a detection result obtained by the detection unit, and reduce flicker caused by the plurality of display units or flicker caused by the light source unit, which is occurring in the projection image.

According to the present invention, because the cause of flicker is analyzed, and then flicker reduction is provided according to the cause of flicker, flicker can be properly reduced without unnecessarily bringing about characteristic degradation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 11A and 11B are flowcharts of a flicker reduction operation according to the present embodiment.

DESCRIPTION OF THE EMBODIMENTS

Various exemplary embodiments, features, and aspects of the invention will be described in detail below with reference to the drawings A description will now be given of a projection apparatus according to a first embodiment. In the present embodiment, the type of flicker is determined using a light source flicker sensor and a liquid crystal display element flicker sensor.

Figure 1:
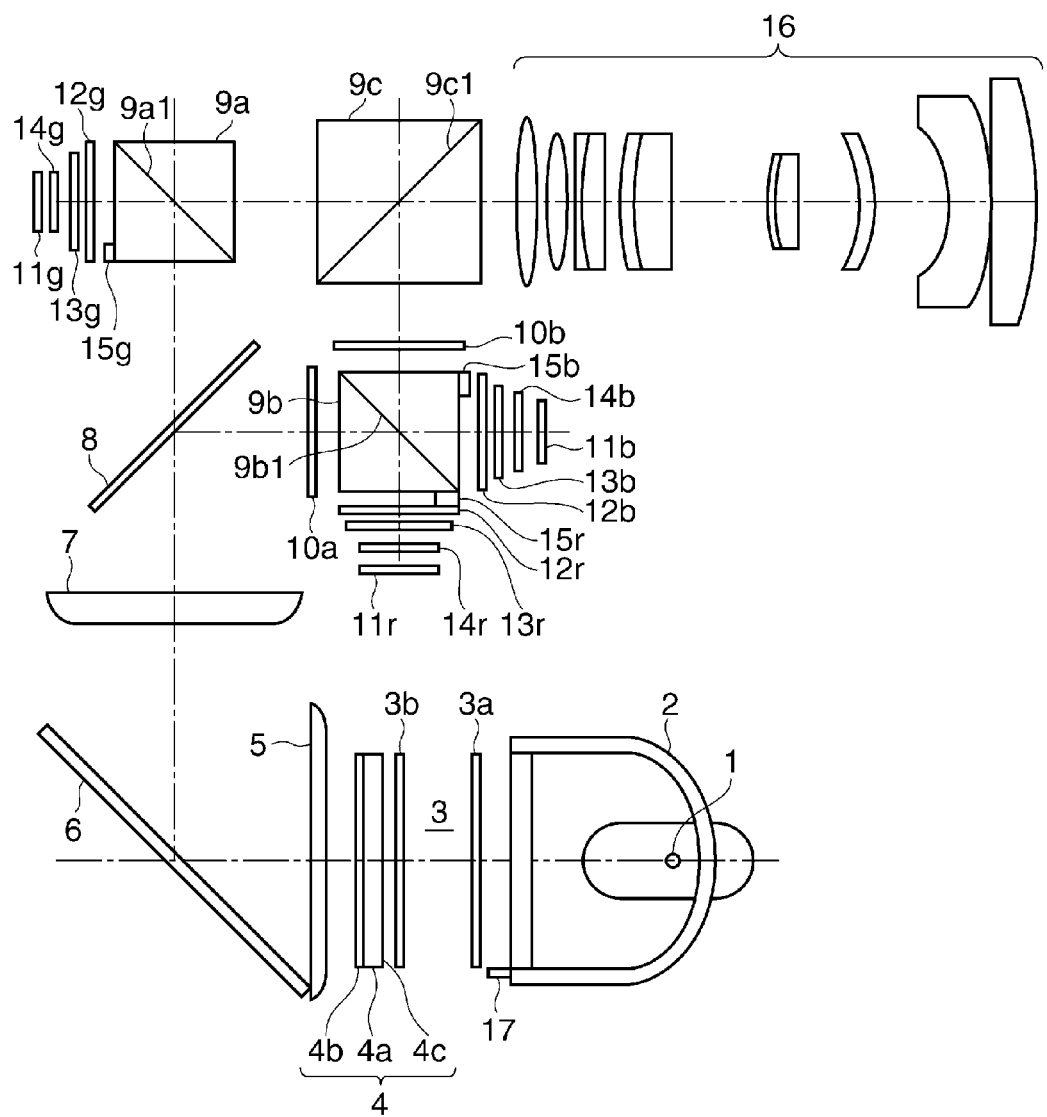
FIG. 1 is a diagram schematically showing an arrangement of an optical system of a projection apparatus according to a first embodiment

FIG. 1 is a diagram schematically showing an arrangement of an optical system of the projection apparatus according to the first embodiment. Referring to FIG. 1, a light source 1 is comprised of a high-pressure mercury light source or the like. A reflector 2 radiates light in predetermined directions from the light source 1. A flicker sensor 17 receives light from the light source 1 so as to detect flicker in the light source 1. An integrator 3 forms a light source region having a uniform light intensity, and is comprised of fly eye lenses 3a and 3b. A polarizing conversion element 4 aligns unpolarized light in a predetermined polarizing direction, and is comprised of a polarizing split film 4a, a ½ wave plate 4b, and a reflective plate 4c.

A condenser lens 5 gathers source light. A reference numeral 6 designates a mirror. A field lens 7 renders source light telecentric. A dichroic mirror 8 passes light in a green wavelength range.

Polarizing beam splitters 9a, 9b, and 9c have polarizing split films 9a1, 9b1, and 9c1, respectively. The polarizing split films 9a1, 9b1, and 9c1 have the property of reflecting s-polarized light and passing p-polarized light.

Color-selective wave plates 10a and 10b change (rotate) 90 degrees the polarizing direction of light in a predetermined wavelength range. Liquid crystal display elements 11r, 11g, and 11b reflect incident source light and modulate the same in accordance with an image signal, thus forming image light. Reference numerals 12r, 12g, and 12b designate ¼ wave plates. Reference numerals 13r, 13g, and 13b designate uniaxial birefringent filters which are birefringent phase difference compensation elements, each of which corrects for phase differences occurring when the liquid crystal display elements 11r, 11g, and 11b are producing displays in black. A reference numeral 16 designates a projector lens.

Luminance modulation liquid crystal display elements 14r, 14g, and 14b control luminances of respective colors, and specifically, they are each comprised of a transmissive liquid crystal.

A description will now be given of an optical action of the optical system shown in FIG. 1. Outgoing light from the light source 1 is gathered in a direction toward the fly eye lens 3a by the reflector 2. This light beam is split into a plurality of light beams by the fly eye lens 3a. The plurality of light beams are superimposed on the liquid crystal display elements 11r, 11g, and 11b through action of the fly eye lens 3b, the condenser lens 5, and the field lens 7. A light source region having a uniform light intensity is formed on each of the liquid crystal display elements 11r, 11g, and 11b.

The plurality of light beams output from the fly eye lens 3b are split into p-polarized light and s-polarized light by the ½ wave plate 4a corresponding to each light beam. The p-polarized light is converted into a polarized component in the same direction as the s-polarized light by the ½ wave plate 4b, and the s-polarized light is reflected by the reflective plate 4c. Thus, as light having predetermined polarizing directions, the plurality of light beams output from the fly eye lens 3b are output in the same direction.

The light having been almost uniformly s-polarized by the polarizing conversion element 4 falls on the dichroic mirror 8 which passes green wavelength range light. The dichroic mirror 8 passes green wavelength range light, and reflects red and blue wavelength range light. The green wavelength range light passed through the dichroic mirror 8 is reflected on the polarizing split film 9a1 of the polarizing beam splitter 9a to pass through the ¼ wave plate 12g. Further, the green wavelength range light passes through the birefringent filter 13g, and passes through the luminance modulation liquid crystal display element 14g, which controls luminance of each color, to fall on the liquid crystal display element 11g. A flicker sensor 15g receives green-color light so as to detect fluctuations in the light quantity of green-color image light.

Of the red and blue wavelength range light reflected on the dichroic mirror 8, only the blue wavelength range light is turned into p-polarized light by the polarizing direction thereof being changed 90 degrees by the color-selective wave plate 10a, whereas the red wavelength range light which is s-polarized light falls as it is on the polarizing beam splitter 9b. The polarizing split film 9b1 of the polarizing beam splitter 9b passes the blue wavelength range light which is p-polarized light, and reflects the red wavelength range light which is s-polarized light. Thus, the light is split into the red and blue wavelength range light whose polarizing directions are perpendicular to each other.

The red wavelength range light reflected on the polarizing beam splitter 9b passes through the ¼ wave plate 12r. The red wavelength range light further passes through the birefringent filter 13r, and passes through the luminance modulation liquid crystal display element 14r, which controls luminance of each color, to fall on the liquid crystal display element 11r. A flicker sensor 15r receives red-color light so as to detect fluctuations in the light quantity of red-color image light.

The blue wavelength range light passed through the polarizing beam splitter 9b passes through the ¼ wave plate 12b. The blue wavelength range light further passes through the birefringent filter 13b, and passes through the luminance modulation liquid crystal display element 14b, which controls luminance of each color, to fall on the liquid crystal display element 11b. A flicker sensor 15b receives blue-color light so as to detect fluctuations in the light quantity of blue-color image light.

The green wavelength range light modulated and reflected by the liquid crystal display element 11g passes through the luminance modulation liquid crystal display element 14g, which controls luminance of each color, the birefringent filter 13g, and the ¼ wave plate 12g to become p-polarized light, and passes through the polarizing beam splitters 9a and 9c.

The red wavelength range light modulated and reflected by the liquid crystal display element 11r passes through the luminance modulation liquid crystal display element 14r, which controls luminance of each color, the birefringent filter 13r and the ¼ wave plate 12r to become p-polarized light, and passes through the polarizing beam splitter 9b to fall on the color-selective wave plate 10b.

The blue wavelength range light modulated and reflected by the liquid crystal display element 11b passes through the luminance modulation liquid crystal display element 14b, which controls luminance of each color, and the birefringent filter 13b, and is converted to s-polarized light by the ¼ wave plate 12b. The blue wavelength range light which is s-polarized light is reflected on the polarizing beam splitter 9b to fall on the color-selective wave plate 10b.

Of the red wavelength range light and the blue wavelength range light that fall on the color-selective wave plate 10b, the red wavelength range light is turned into s-polarized light by the polarizing direction thereof being changed 90 degrees, whereas the blue wavelength range light which is s-polarized light passes as it is through the color-selective wave plate 10b. The polarizing beam splitter 9c reflects the red wavelength range light and the blue wavelength range light, both of which are s-polarized light, from the color-selective wave plate 10b.

The polarizing beam splitter 9c synthesizes the light in all of the red, green, and blue wavelength ranges, and supplies the synthesized light to the projector lens 16. The projector lens 16 projects the synthesized light onto a screen, not shown, or the like.

Figure 2:
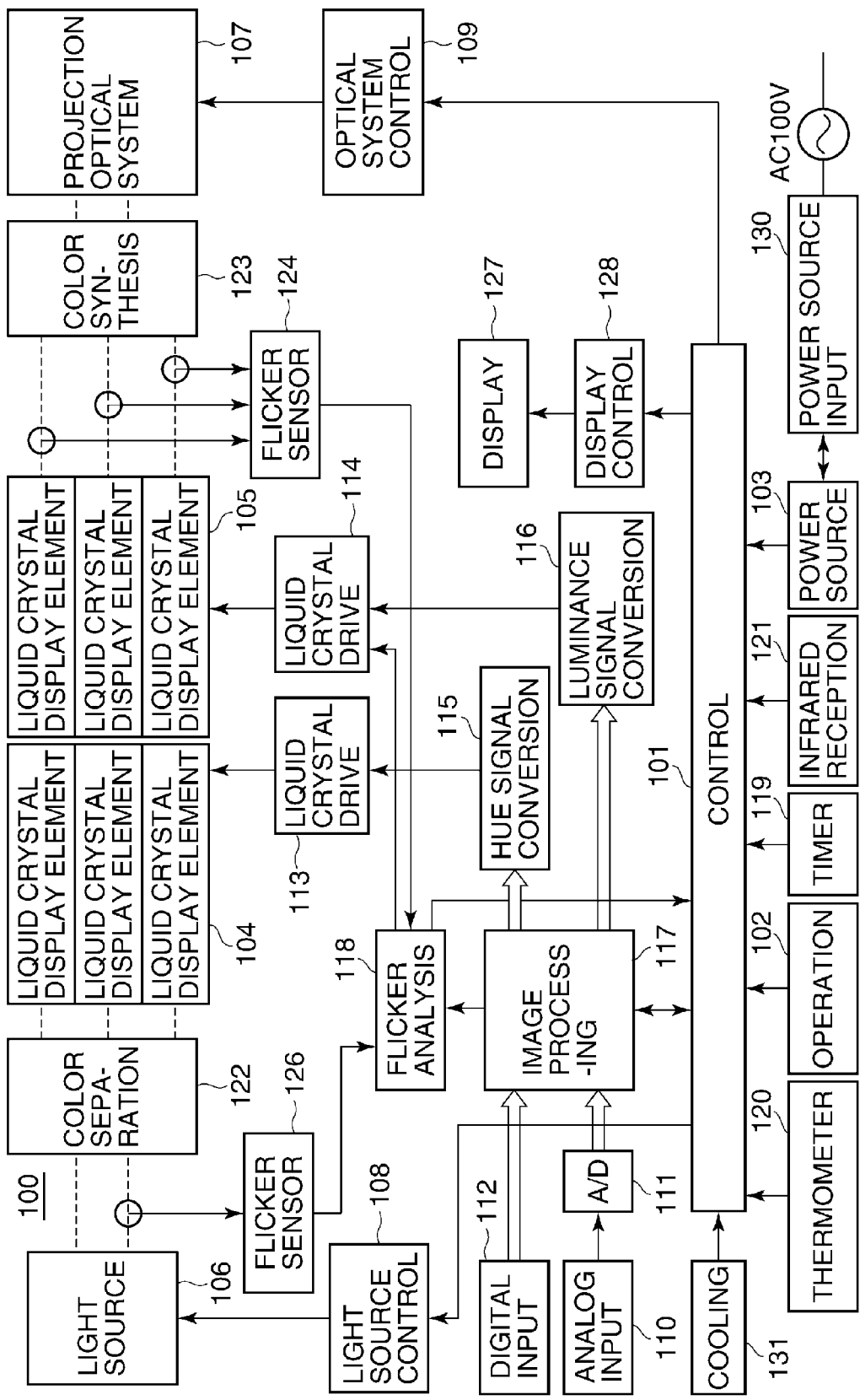
FIG. 2 is a block diagram schematically showing an arrangement of an electric system according to the present embodiment.

FIG. 2 is a block diagram schematically showing an arrangement of an electric system according to the present embodiment. A projection apparatus 100 is an embodiment of the projection apparatus. A control unit 101 controls blocks of the projection apparatus 100. A console 102 receives operations from a user. A power source unit 103 controls power supply to the blocks of the projection apparatus 100. A liquid crystal unit 104 displays a hue signal, and a liquid crystal unit 105 displays a luminance signal. The liquid crystal units 104 and 105 are each comprised of three liquid crystal display elements and others, and form images on the liquid crystal display elements.

A light source 106 supplies light to the liquid crystal unit 104. A projection optical system 107 projects an optical image, which is formed by supplying light emitted from the light source 106 to the liquid crystal units 104 and 105, onto the screen, not shown. The projection optical system 107 corresponds to the projector lens 16 appearing in FIG. 1. A light source control unit 108 controls the light quantity or the like of light beams including the light source 106. An optical system control unit 109 controls a zoom lens, a focus lens, and so on of the projection optical system 107, and controls zoom rate and focus.

An analog input unit 110 receives an analog video signal from a PC (personal computer), a DVD reproducer, a television tuner, or the like, and is comprised of an RGB terminal, an S terminal, and so on. An A/D conversion unit 111 converts the analog video signal, which is obtained from the analog input unit 110, to a digital signal. The video signal converted to the digital signal by the A/D conversion unit 111 is supplied to an image processing unit 117. A digital input unit 112 receives a digital video signal from a PC, a DVD reproducer, or the like, and is comprised of an HDMI terminal and others. When the digital input unit 112 is an HDMI terminal, a control signal may also be transmitted from outside at the same time, and image control or the like may be carried out based on this control signal.

The image processing unit 117 carries out processes such as color correction and image quality correction on video signals input to the analog input unit 110 and the digital input unit 112, video signals from the control unit 101, and so on to generate an RGB video signal. A hue signal conversion unit 115 generates a hue signal from the RGB video signal generated by the image processing unit 117. A luminance signal conversion unit 116 generates a luminance signal from the RGB video signal generated by the image processing unit 117.

In accordance with image signals from the hue signal conversion unit 115 and the luminance signal conversion unit 116, liquid crystal drive units 113 and 114 drive the liquid crystal display elements of the liquid crystal units 104 and 105 to form images.

A timer 119 detects an operating time of the projection apparatus 100, an operating time of each block, and so on. A thermometer 120 measures temperature of the light source 106 and temperature of the liquid crystal units 104 and 105 of the projection apparatus 100, external temperature, and so on. An infrared receiving unit 121 receives infrared rays from a remote control attached to the projection apparatus 100 and other devices, and sends them to the control unit 101. The infrared receiving unit 121 may be disposed, for example, at a plurality of points in the longitudinal direction of the projection apparatus 100.

A split optical unit 122 splits light output from the light source 106 into three RGB colors. The light of the three colors split by the split optical unit 122 passes through the liquid crystal units 104 and 105, and is synthesized by a color synthesis unit 123 and projected from the projection optical system 107. A flicker sensor 124 measures the light quantities of light beams of the respective colors, and is comprised of the flicker sensors 15g, 15b, and 15r. The flicker sensor 124 includes a light diffuser plate and others, and optically detects averages of the light quantities of light beams at a plurality of measurement points.

A flicker sensor 126 measures the quantity of light output from the light source 106. The flicker sensor 126 measures the quantity of light in the light source 106 itself. The measured quantity of light is used in detecting flicker caused by the light source 106. The flicker sensor 126 is comprised of the flicker sensor 17.

The flicker sensor 126 corresponds to a first flicker sensor of claim 1, and the flicker sensor 124 corresponds to a second flicker sensor of claim 1.

A flicker analysis unit 118 analyzes output signals from the flicker sensors 124 and 126 to determine whether flicker caused by the light source is occurring, and whether flicker caused by the liquid crystal display element is occurring. For example, when the flicker sensor 126 detects no flicker phenomenon, and the flicker sensor 124 detects a flicker phenomenon, it can be determined that the flicker caused by the liquid crystal display element is occurring. Also, when the flicker sensor 126 detects a flicker phenomenon, it can be determined that the flicker is occurring in the light source.

For flicker caused by the liquid crystal display element, it is necessary to extract a flicker component after canceling a fluctuation in the light quantity of projection image data itself when a normal image is projected. Thus, the flicker analysis unit 118 captures image data from the image processing unit 117, averages the image data, and extracts a fluctuation component of the image data itself. Then, the flicker analysis unit 118 extracts a fluctuation component of a projection image itself from the light quantity obtained by the flicker sensor 124. Alternatively, there may be a flicker measurement mode in which a specific image pattern having a uniform tone with no temporal change is output for use in determining whether or not flicker occurs. In this state, the flicker sensor 124 detects the quantity of light, and the flicker analysis unit 118 extracts a flicker component of the image pattern.

A display unit 127, which is provided in the projection apparatus 100, displays conditions of the projection apparatus 100, warnings, and so on. A display control unit 128 controls the display unit 127. A power input unit 130 receives alternating-current power from outside, rectifies the power to a predetermined voltage, and supplies the rectified power to the power source unit 103. A cooling unit 131 cools the projection apparatus 100 by externally releasing heat in the projection apparatus 100, and is comprised of, for example, a heat sink and a fan.

Figure 3:
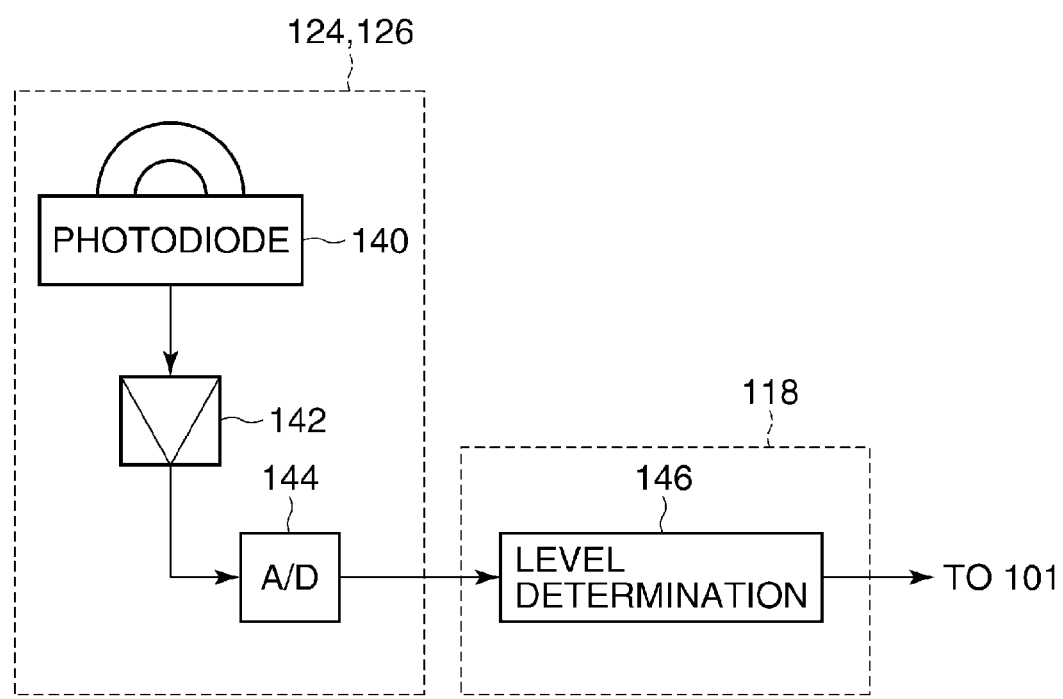
FIG. 3 is a block diagram schematically showing arrangements of flicker sensors and a flicker analysis unit according to the present embodiment.

FIG. 3 is a block diagram schematically showing arrangements of the flicker sensors 124 and 126 and the flicker analysis unit 118. The flicker sensors 124 and 126, which are comprised of a photodiode 140, an amplifier 142, and an A/D converter 144, amplify and digitalize an optical signal received by the photodiode 140 and supply the optical signal to the flicker analysis unit 118. In the flicker analysis unit 118, a level determination circuit 146 determines whether or not the output signal from the flicker sensors 124 and 126 has a fluctuation component with an amplitude not less than a predetermined intensity. When there is an amplitude not less than a predetermined intensity, the flicker analysis unit 118 supplies a signal indicative of flicker detected and an amount thereof to the control unit 101.

A description will now be given of normal operations of the projection apparatus 100. In response to a power-on instruction from the console 102, the control unit 101 instructs the power source unit 103 to supply power to each block, thus bringing each block into standby state. When power is turned on, the control unit 101 instructs the light source control unit 108 to start light emission from the light source 106.

Based on information such as instructions input from the console 102, the control unit 101 instructs the light source control unit 108 to make adjustments to the projection optical system 107. The optical system control unit 109 causes the zoom lens and the focus lens of the projection optical system 107 to operate so that projection light can form an image on the screen. At this time point, preparations for projection are completed.

A video signal input to the digital input unit 112 is converted to a resolution suitable for the liquid crystal units 104 and 105, and subjected to gamma correction, luminance non-uniformity correction, and keystone correction by the image processing unit 117. Then, a luminance component of the video signal corrected by the image processing unit 117 is supplied to the liquid crystal drive unit 114 via the luminance signal conversion unit 116, and a hue signal is supplied to the liquid crystal drive unit 113 via the hue signal conversion unit 115. The liquid crystal drive units 113 and 114 drive the respective liquid crystal units 104 and 105 according to the respective input signals to form images.

Light emitted from the light source 106 is spatially intensity-modulated by the images formed by the liquid crystal display elements of the liquid crystal units 104 and 105, and projected onto the screen, not shown, by the projection optical system 107.

The flicker sensors 124 and 126 continue measuring the light quantity during the projection, and the flicker analysis unit 118 analyzes the cause, presence or absence, and extent of flicker. When flicker is caused by the light source 106, the control unit 101 causes the light source control unit 108 to control electrical power supplied to the power source 106 so that flicker caused by the light source can be reduced. An aperture may be provided in an output stage of the light source 106, and the degree of opening of this aperture may be controlled in opposite phase to flicker.

When flicker is caused by the liquid crystal display element, the flicker analysis unit 118 controls the liquid crystal display elements of the liquid crystal unit 105 to thereby reduce flicker caused by the liquid crystal display element. Specifically, the flicker analysis unit 118 supplies light quantity signals of the respective colors from the flicker sensor 124 to liquid crystal drive unit 114. In response to the light quantity signals from the flicker analysis unit 118, the liquid crystal drive unit 114 drives the liquid crystal display elements of the liquid crystal unit 105 in opposite phase to fluctuations in light quantity due to flicker. By driving the liquid crystal display elements in opposite phase, flicker caused by the liquid crystal display element can be reduced. Alternatively, in response to fluctuations in light quantity caused by flicker, the liquid crystal drive unit 114 may dynamically control the opposing electrode voltage Vcom of the luminance modulation liquid crystal display elements.

During the projection, the control unit 101 detects temperatures of the light source 106 and others using the thermometer 120, and for example, when the temperature of the light source 106 becomes equal to or higher than a predetermined temperature, the control unit 101 causes the cooling unit 131 to cool the light source 106.

When a power-off instruction is given through the console 102, the control unit 101 instructs the blocks to carry out end processing. When preparations for ending are completed, the power source unit 103 sequentially stops power supply to the blocks. After power is turned off, the cooling unit 131 operates for a while to cool the projection apparatus 100.

Although the case where a video signal input from the digital input unit 112 is displayed has been described, the same holds for a case where an input image from the analog input unit 110 is displayed.

Figure 4A:
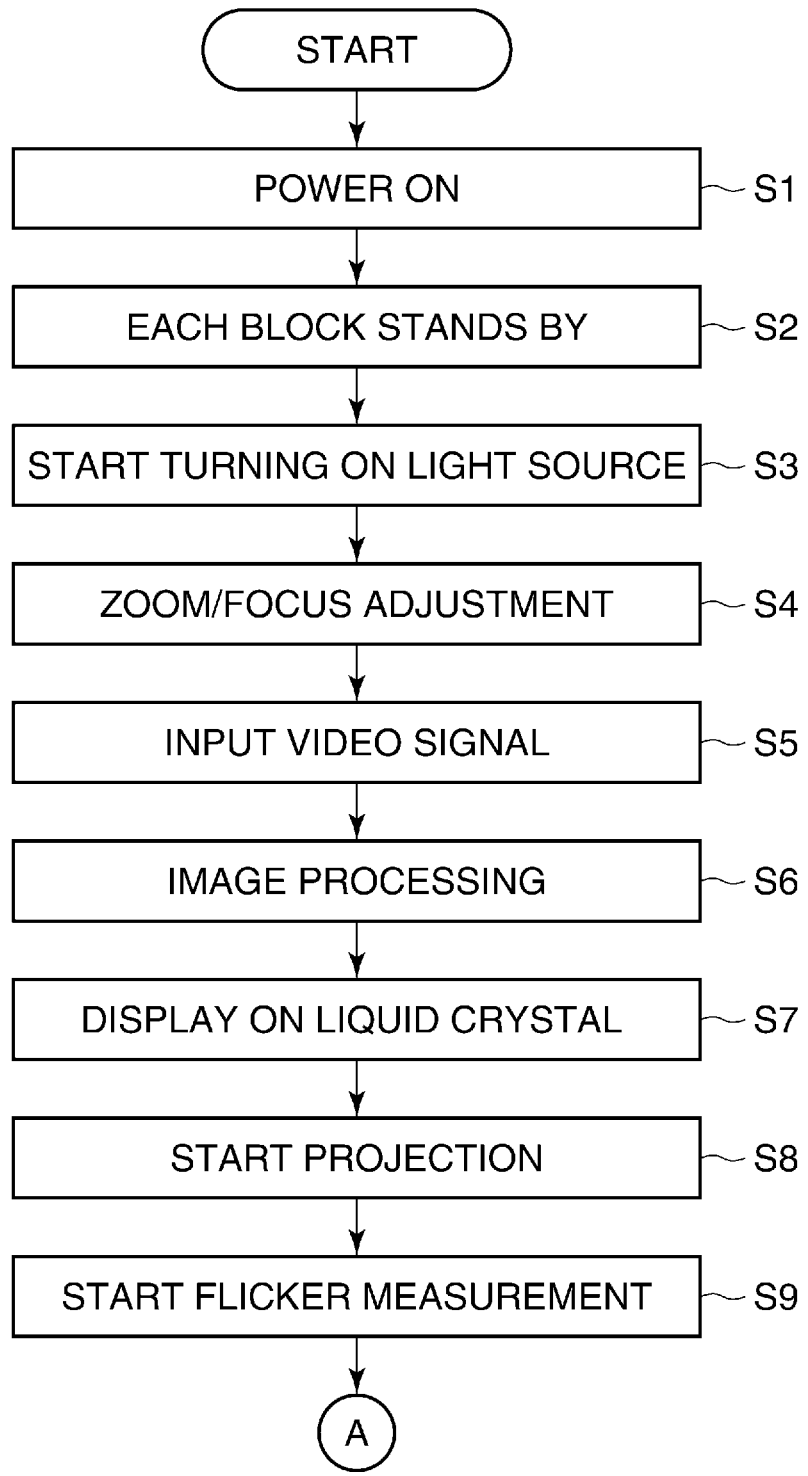
FIGS. 4A and 4B are flowcharts of a flicker reduction operation according to the present embodiment.
Figure 4B:
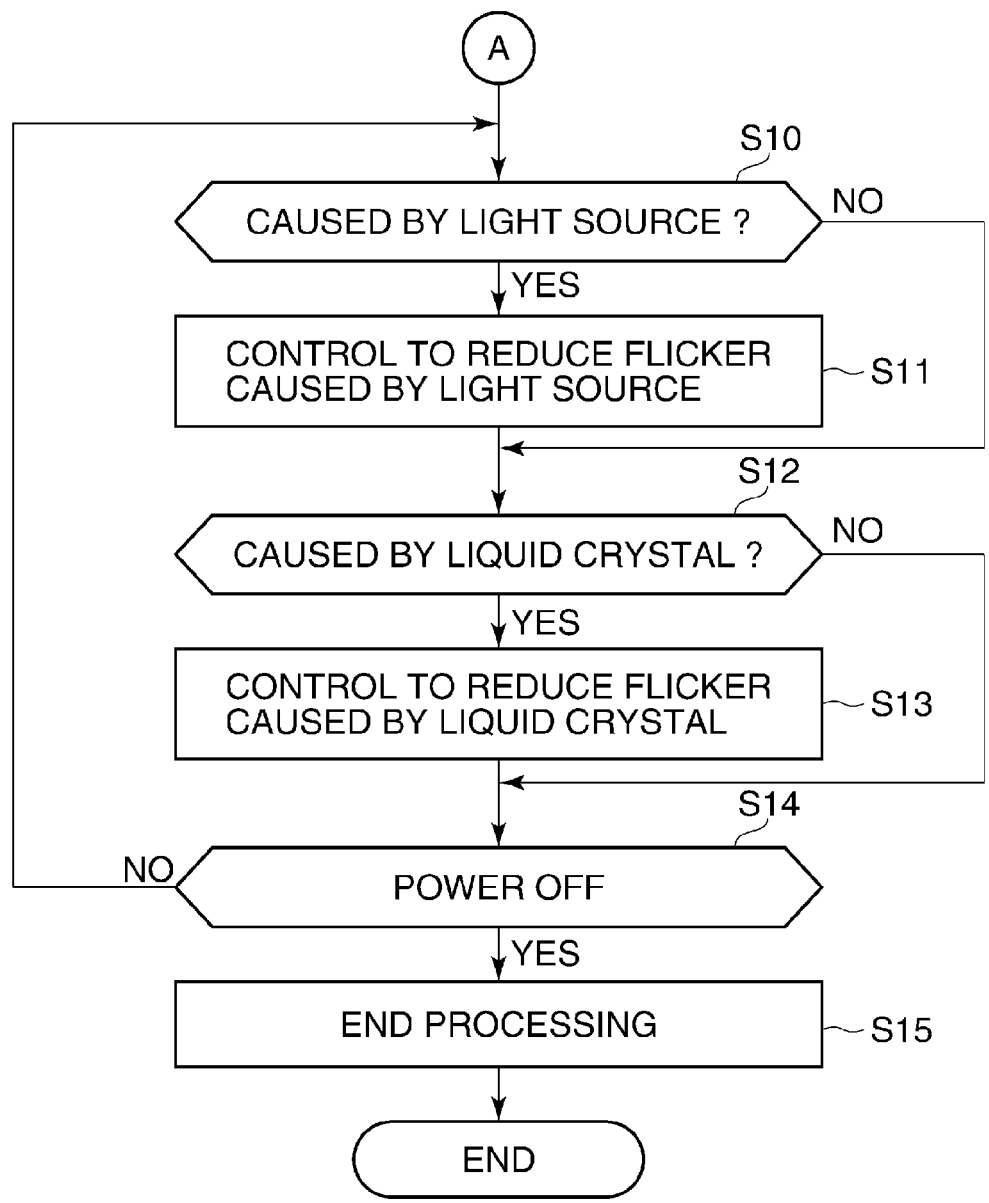

FIGS. 4A and 4B are flowcharts of a characteristic operation according to the present embodiment. Referring to FIGS. 4A and 4B, a description will be given of a flicker reduction operation according to the present embodiment.

In step S1, power to the projection apparatus 100 is turned on.

In step S2, in response to a power-on instruction given through the console 102, the control unit 101 instructs the power source unit 103 to supply power to each block, thus bringing each block into standby state.

After power is turned on in step S3, the control unit 101 instructs the light source control unit 108 to start light emission from the light source 106.

In step S4, based on information such as instructions input from the console 102, the control unit 101 instructs the optical system control unit 109 to make adjustments to the projection optical system 107. The optical system control unit 109 causes the zoom lens and the focus lens of the projection optical system 107 to operate so that projection light can form an image on the screen. Thus, preparations for projection are completed.

In step S5, a video signal is input to the digital input unit 112 or the analog input unit 110.

In step S6, the image processing unit 117 converts the input video signal to a resolution suitable for the liquid crystal units 104 and 105, and subjects the input video signal to gamma correction, luminance nonuniformity correction, and keystone correction. Then, the video signal corrected by the image processing unit 117 is input to and processed by the hue signal conversion unit 115 and the luminance signal conversion unit 116, and sent to each of the liquid crystal drive units 113 and 114.

In step S7, the liquid crystal drive units 113 and 114 cause the liquid crystal units 104 and 105 to form images.

In step S8, the images formed by the liquid crystal units 104 and 105 are guided to the projection optical system 107 by light emitted from the light source 106, and the projection optical system 107 projects an image onto the screen, not shown.

In step S9, the flicker sensors 124 and 126 start flicker measurement.

In step S10, based on an output signal from the flicker sensor 126, the flicker analysis unit 118 determines whether or not flicker caused by the light source is occurring. Based on the result of the analysis by the flicker analysis unit 118, when it is determined that flicker caused by the light source is occurring, the process proceeds to step S11, and when it is determined that flicker caused by the light source is not occurring, the process proceeds to step S12.

In the step S11, in accordance with the result of the analysis by the flicker analysis unit 118, the control unit 101 causes the light source control unit 108 to control the quantity of light output from the light source 106 so that the quantity of light in the light source 106 can be maintained constant. That is, flicker caused by the light source is reduced.

In the step S11, the flicker analysis unit 118 determines whether or not flicker caused by the liquid crystal display element is occurring. When flicker caused by the liquid crystal display element is found although no flicker caused by the light source is found, this means that flicker caused by the liquid crystal display element is occurring, and the process proceeds to step S13. When flicker caused by the liquid crystal display element is not found, the process proceeds to step S14.

In the step S13, to reduce flicker caused by the liquid crystal display element, the flicker analysis unit 118 sends light quantity signals of the respective colors from the flicker sensor 124 to the liquid crystal drive unit 114. In response to the light quantity signals of the respective colors, the liquid crystal drive unit 114 drives the liquid crystal display elements of the liquid crystal unit 105 in opposite phase to fluctuations in light quantity. As a result, flicker caused by the liquid crystal display element is reduced. Alternatively, in response to fluctuations in light quantity caused by flicker, the liquid crystal drive unit 114 may dynamically control the opposing electrode voltage Vcom of the liquid crystal display elements of the liquid crystal unit 105.

In the step S14, the control unit 101 waits for a power-off instruction. When a power-off instruction is given via the console 102, the control unit 101 instructs the blocks to carry out end processing. Then, when preparations for ending are completed, the power source unit 103 sequentially ends supply of power to the blocks. After power-off, the cooling unit 131 operates for a while to cool the projection apparatus 100.

In the present embodiment, because whether flicker is caused by the light source or the liquid crystal display elements is determined, and flicker reduction is provided according to the cause, flicker can be reduced without deteriorating display characteristics such as display contrast on the liquid crystal display elements.

A description will now be given of a second embodiment. In the present embodiment, the type of flicker is determined using a liquid crystal display element flicker sensor.

Figure 5:
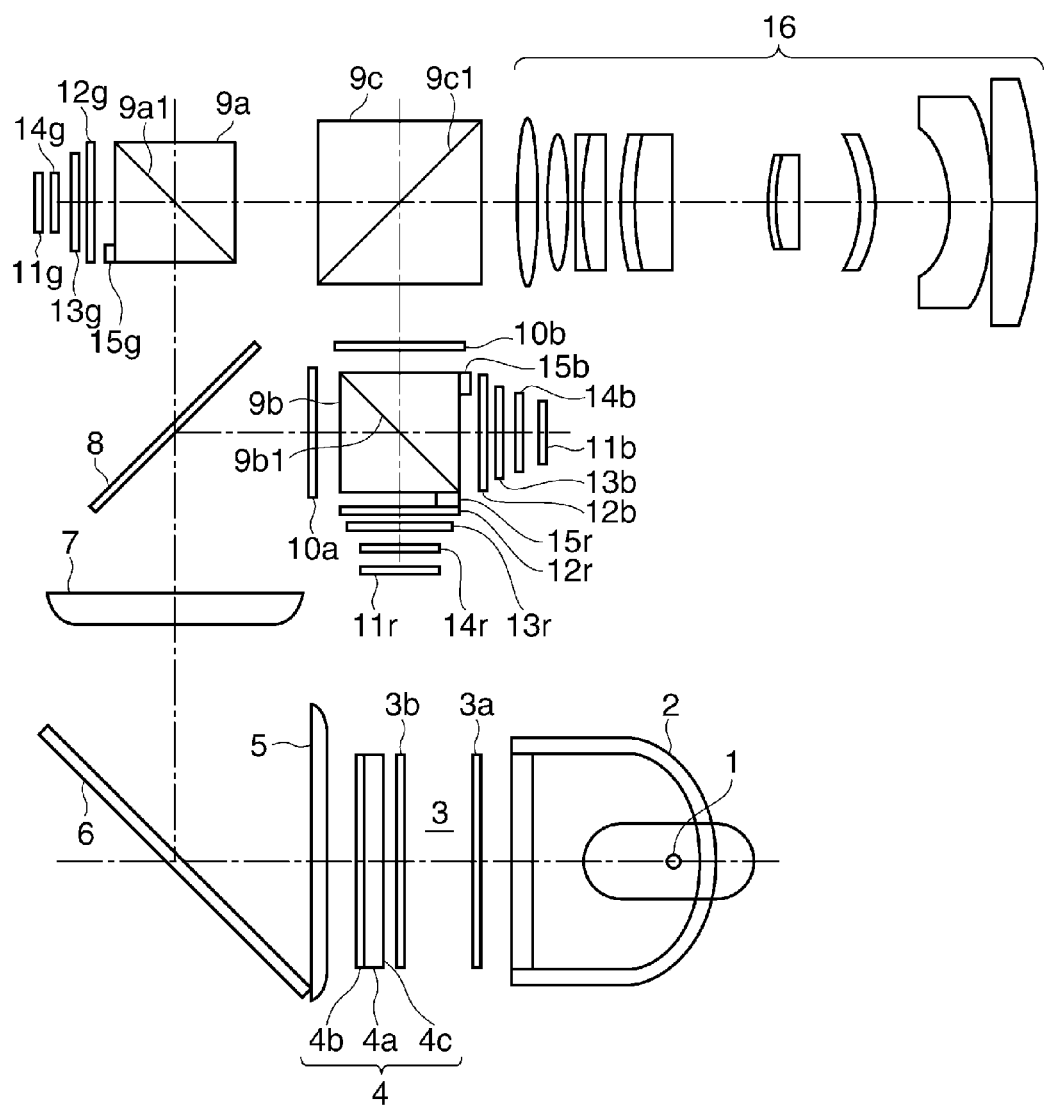
FIG. 5 is a diagram schematically showing an arrangement of a projection apparatus according to a second embodiment.

FIG. 5 is a diagram schematically showing an arrangement of an optical system according to the second embodiment. In the optical system shown in FIG. 5, the flicker sensor 17 in the optical system shown in FIG. 1 is omitted. The same component elements as those in FIG. 1 are designated by the same reference numerals.

Figure 6:
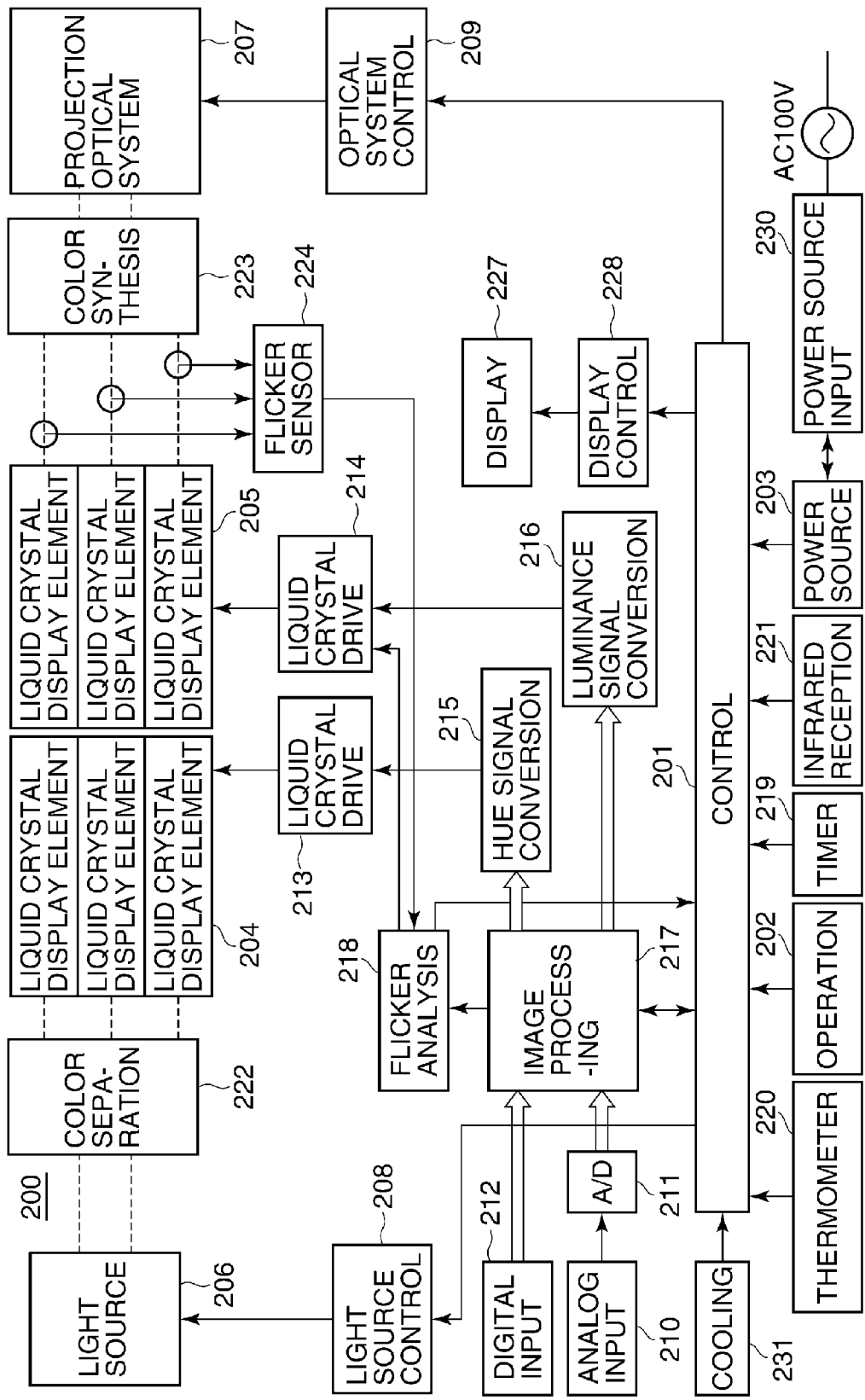
FIG. 6 is a block diagram schematically showing an arrangement of an electric system according to the present embodiment.

FIG. 6 is a block diagram schematically showing an arrangement of an electric system according to the second embodiment. A reference numeral 200 designates a projection apparatus. A control unit 201 controls blocks of the projection apparatus 200. A console 202 receives operations from the user. A power source unit 203 controls power supply to the blocks of the projection apparatus 100. A liquid crystal unit 204 displays a hue signal, and a liquid crystal unit 205 displays a luminance signal. The liquid crystal units 204 and 205 are each comprised of three liquid crystal display elements and others, and form images on the liquid crystal display elements.

A light source 206 supplies light to the liquid crystal unit 204. A projection optical system 207 projects an optical image, which is formed by supplying light emitted from the light source 206 to the liquid crystal units 204 and 205, onto a screen, not shown. A light source control unit 208 controls the light quantity or the like of light beams including the light source 206. An optical system control unit 209 controls a zoom lens, a focus lens, and so on of the projection optical system 207, and controls zoom rate and focus.

An analog input unit 210 receives an analog video signal from a PC (personal computer), a DVD reproducer, a television tuner, or the like, and is comprised of an RGB terminal, an S terminal, and so on. An A/D conversion unit 211 converts the analog video signal, which is obtained from the analog input unit 210, to a digital signal. The video signal converted to the digital signal by the A/D conversion unit 211 is supplied to an image processing unit 217. A digital input unit 212 receives a digital video signal from a PC, a DVD reproducer, or the like, and is comprised of an HDMI terminal and others. When the digital input unit 212 is an HDMI terminal, a control signal may also be sent from outside at the same time, and image control or the like may be carried out based on this control signal.

The image processing unit 217 carries out processes such as color correction and image quality correction on video signals input to the analog input unit 210 and the digital input unit 212, video signals from the control unit 201, and so on to generate an RGB video signal. A hue signal conversion unit 215 generates a hue signal from the RGB video signal generated by the image processing unit 217. A luminance signal conversion unit 216 generates a luminance signal from the RGB video signal generated by the image processing unit 217.

In accordance with image signals from the hue signal conversion unit 215 and the luminance signal conversion unit 216, liquid crystal drive units 213 and 214 drive the liquid crystal display elements of the liquid crystal units 204 and 205 to form images.

A timer 219 detects an operating time of the projection apparatus 200, an operating time of each block, and so on. A thermometer 220 measures temperature of the light source 206 and temperature of the liquid crystal units 204 and 205 of the projection apparatus 200, external temperature, and so on. An infrared receiving unit 221 receives infrared rays from a remote control attached to the projection apparatus 200 and other devices, and sends them to the control unit 201. The infrared receiving unit 221 may be disposed, for example, at a plurality of points in the longitudinal direction of the projection apparatus 200.

A split optical unit 222 splits light output from the light source 206 into three RGB colors. The light of the three colors split by the split optical unit 222 passes through the liquid crystal units 204 and 205, and is synthesized by a color synthesis unit 223 and projected from the projection optical system 207. A flicker sensor 224 measures the light quantities of light beams of the respective colors, and is comprised of the flicker sensors 15g, 15b, and 15r. The flicker sensor 224 includes a light diffuser plate and others, and optically detects averages of the light quantities of light beams at a plurality of measurement points.

A flicker analysis unit 218 analyzes an output signal from the flicker sensor 224 to determine whether flicker caused by the light source occurs, and whether flicker caused by the liquid crystal display element occurs.

A display unit 227, which is provided in the projection apparatus 200, displays conditions of the projection apparatus 200, warnings, and so on. A display control unit 228 controls the display unit 227. A power input unit 230 receives alternating-current power from outside, rectifies the power to a predetermined voltage, and supplies the rectified power to the power source unit 203. A cooling unit 231 cools the projection apparatus 200 by releasing heat in the projection apparatus 200 to outside, and is comprised of, for example, a heat sink and a fan.

Figure 7:
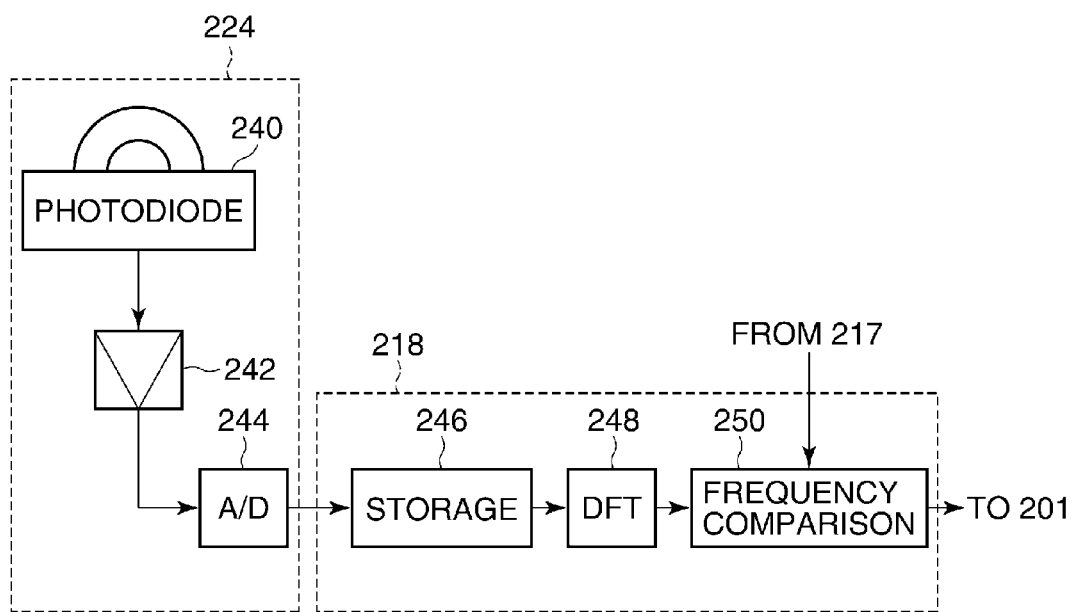
FIG. 7 is a block diagram schematically showing arrangements of flicker sensors and a flicker analysis unit according to the present embodiment.

FIG. 7 is a block diagram schematically showing arrangements of the flicker sensor 224 and the flicker analysis unit 218. The flicker sensor 224 is comprised of a photodiode 240, an amplifier 242, and an A/D converter 244, amplifies and digitalizes an optical signal received by the photodiode 240, and supplies the optical signal to the flicker analysis unit 218. The flicker analysis unit 218 has an intensity data storage unit 246, a discrete Fourier transform circuit (DFT circuit) 248, and a frequency comparison unit 250. The intensity data storage unit 246 stores a light intensity value from the flicker sensor 224. The DFT unit 246 carries out discrete Fourier transform of the light intensity value stored in the intensity data storage unit 246, and extracts a frequency component. The frequency comparison unit 250 compares a liquid crystal drive frequency sent from the image processing unit 217 and a flicker frequency detected by the DFT unit 246 with each other, and posts the comparison result to the control unit 201. When the liquid crystal drive frequency and the flicker frequency are equal, it can be determined that flicker is caused by the liquid crystal display element, and when the value of the liquid crystal drive frequency and the flicker frequency are not equal, it can be determined that flicker is caused by the light source. Even when flicker caused by the liquid crystal display element and flicker caused by the light source are occurring in combination, flicker reduction responsive to the liquid crystal drive frequency can be provided first, and measures to reduce flicker caused by the light source can be taken against the remaining flicker.

A description will now be given of normal operations of the projection apparatus 200. In response to a power-on instruction from the console 202, the control unit 201 instructs the power source unit 203 to supply power to each block, thus bringing each block into standby state. When power is turned on, the control unit 201 instructs the light source control unit 208 to start light emission from the light source 206.

Based on information such as instructions input from the console 202, the control unit 201 instructs the optical system control unit 209 to make adjustments to the projection optical system 207. The optical system control unit 209 causes the zoom lens and the focus lens of the projection optical system 207 to operate so that projection light can form an image on the screen. At this time point, preparations for projection are completed.

A video signal input to the digital input unit 212 is converted to a resolution suitable for the liquid crystal units 204 and 205, and subjected to gamma correction, luminance non-uniformity correction, and keystone correction by the image processing unit 217. Then, a luminance component of the video signal corrected by the image processing unit 217 is supplied to the liquid crystal drive unit 214 via the luminance signal conversion unit 216, and a hue signal is supplied to the liquid crystal drive unit 213 via the hue signal conversion unit 215. The liquid crystal drive units 213 and 214 drive the respective liquid crystal units 204 and 205 according to the respective input signals to form images.

Light emitted from the light source 206 is spatially intensity-modulated by the images formed by the liquid crystal display elements of the liquid crystal units 204 and 205, and projected onto the screen, not shown, by the projection optical system 207.

The flicker sensor 224 continues measuring light quantity during the projection, and the flicker analysis unit 218 analyzes the cause, presence or absence, and extent of flicker. Flicker in the liquid crystal display elements depends on frame update frequency or drive frequency. Thus, by carrying out frequency analysis on a fluctuation component extracted from an output signal from the flicker sensor 224, flicker caused the liquid crystal can be identified. Also, when normal image projection is carried out, it is necessary to cancel a fluctuation in the light quantity of projection image data itself and then extract a flicker component. Accordingly, after image data is captured from the image processing unit 217 and averaged, a fluctuation component of the image data itself is extracted. The fluctuation component of the image data itself is canceled from the light quantity obtained by the flicker sensor 224.

Alternatively, there may be a flicker measurement mode where an image pattern having a uniform tone with no temporal change is output for use in determining whether or not flicker is occurring. The flicker sensor 224 detects a fluctuation in light quantity with respect to the image pattern having the uniform tone, and the flicker analysis unit 418 extracts its flicker component.

Here, because the quantity of light after splitting by the split optical unit 222 is measured, a color of the liquid crystal display element where flicker is occurring can also be identified.

A description will now be given of a flicker reduction operation according to the present embodiment. It is assumed here that the update drive frequency of the liquid crystal units 204 and 205 is 120 Hz. When flicker is detected only by the flicker sensor 15b and its frequency is 120 Hz, it can be estimated that flicker is occurring in the liquid crystal display element of the blue color. However, when the flicker frequency is not equal to the drive frequency of the liquid crystal display elements, and a common flicker component is detected by all the flicker sensors 15r, 15g, and 15b, it can be estimated that flicker is caused by the light source. Also, when drive frequencies are equal but phases are different, it can be estimated that flicker is not caused by the liquid crystal display element.

When flicker is caused by the light source, the control unit 201 causes the light source control unit 208 to control the light quantity of the light source 206 so that flicker caused by the light source can be reduced. When flicker is caused by the light crystal display elements, the flicker analysis unit 218 controls the liquid crystal unit 205 via the liquid crystal drive unit 214 so that flicker caused by the liquid crystal display element can be reduced. Specifically, the flicker analysis unit 218 supplies light quantity signals of the respective colors from the flicker sensor 224 to the liquid crystal drive unit 214. In response to the light quantity signals from the flicker analysis unit 218, the liquid crystal drive unit 214 drives the liquid crystal display elements of the liquid crystal unit 205 in opposite phase to fluctuations in the light quantity due to flicker. By driving the liquid crystal display elements in opposite phase, flicker caused by the liquid crystal display element can be reduced. Alternatively, in response to fluctuations in light quantity caused by flicker, the liquid crystal drive unit 214 may dynamically control the opposing electrode voltage Vcom of the liquid crystal display elements of the liquid crystal unit 205.

During the projection, the control unit 201 detects temperatures of the light source 206 and others using the thermometer 220, and for example, when the temperature of the light source 206 becomes equal to or higher than a predetermined temperature, the control unit 201 causes the cooling unit 231 to cool the light source 206.

When a power-off instruction is given through the console 202, the control unit 201 instructs the blocks to carry out end processing. When preparations for ending are completed, the power source unit 203 sequentially stops power supply to the blocks. After power is turned off, the cooling unit 231 operates for a while to cool the projection apparatus 200.

Although the case where a video signal input from the digital input unit 212 is displayed has been described, the same holds for a case where an input image from the analog input unit 210 is displayed.

Figure 8A:
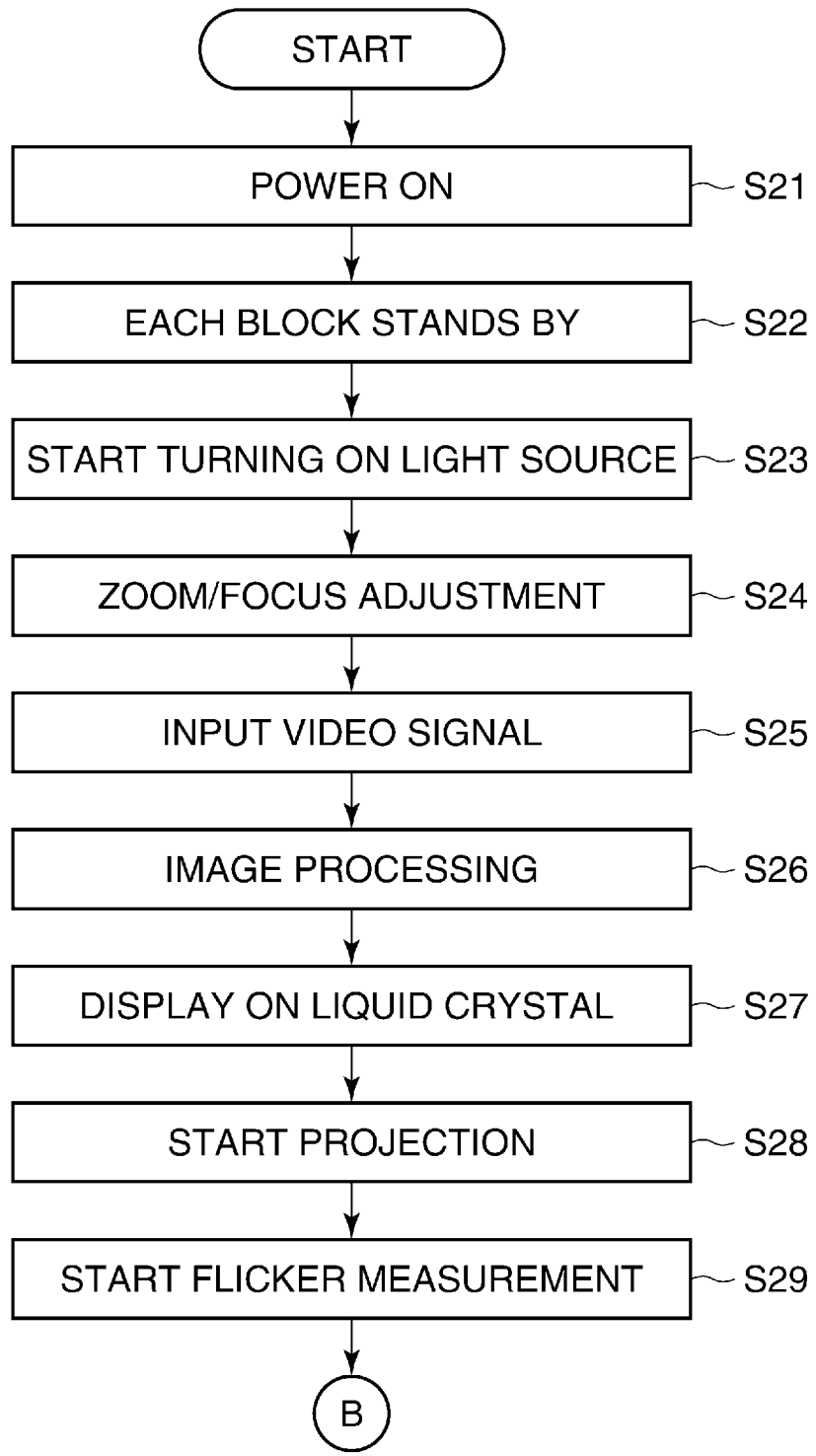
FIGS. 8A and 8B are flowcharts of a flicker reduction operation according to the present embodiment.
Figure 8B:
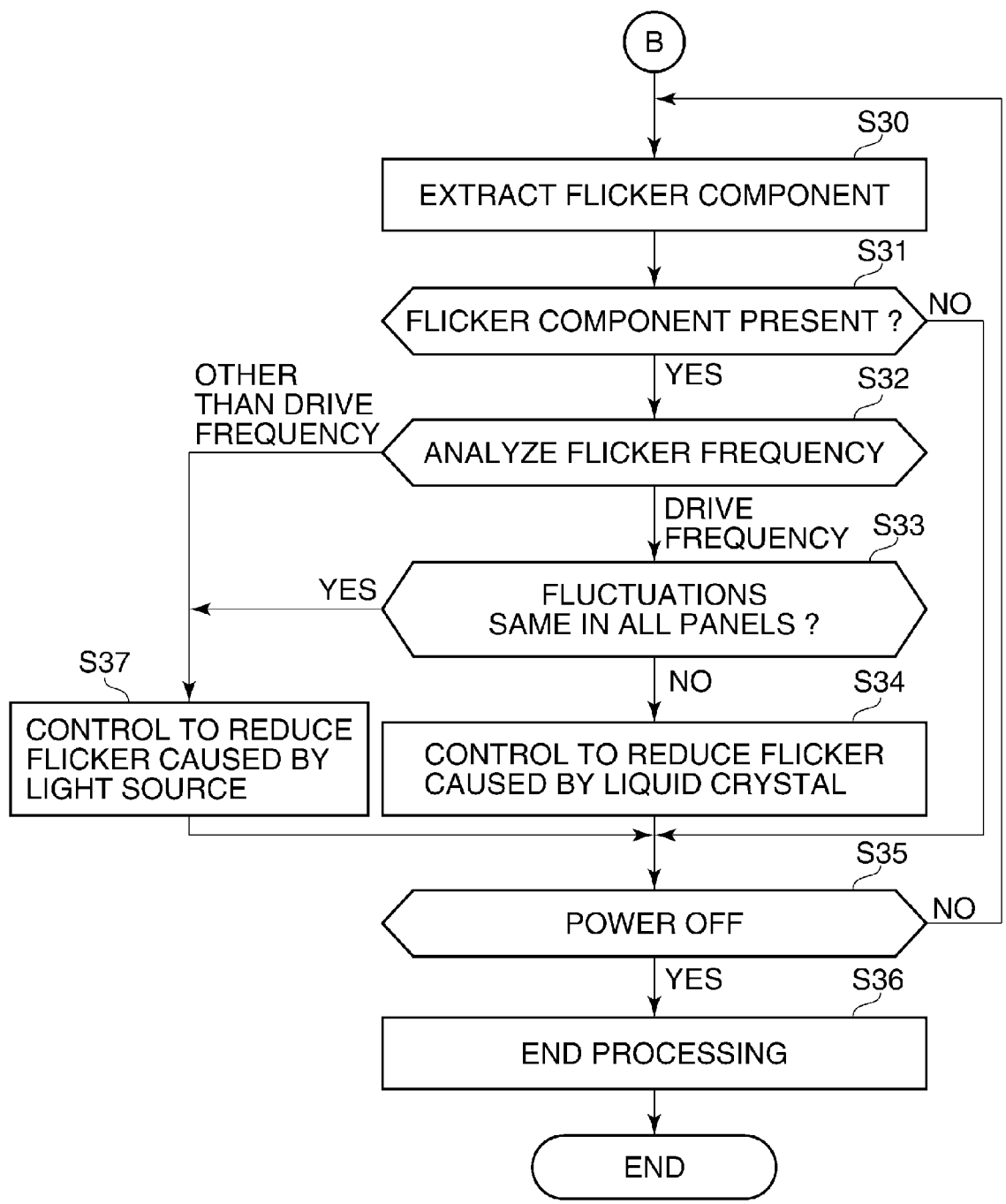

FIGS. 8A and 8B are flowcharts of a characteristic operation according to the present embodiment. Referring to FIGS. 8A and 8B, a description will be given of a flicker reduction operation according to the present embodiment.

In step S21, power to the projection apparatus 200 is turned on.

In step S22, in response to a power-on instruction given through the console 202, the control unit 201 instructs the power source unit 203 to supply power to each block, thus bringing each block into standby state.

After power is turned on in step S23, the control unit 201 instructs the light source control unit 208 to start light emission from the light source 206.

In step S24, based on information such as instructions input from the console 202, the control unit 201 instructs the optical system control unit 209 to make adjustments to the projection optical system 207. The optical system control unit 209 causes the zoom lens and the focus lens of the projection optical system 207 to operate so that projection light can form an image on the screen. Thus, preparations for projection are completed.

In step S25, a video signal is input to the digital input unit 212 or the analog input unit 210.

In step S26, the image processing unit 217 converts the input video signal to a resolution suitable for the liquid crystal units 204 and 205, and subjects the input video signal to gamma correction, luminance nonuniformity correction, and keystone correction. Then, the video signal corrected by the image processing unit 217 is input to and processed by the hue signal conversion unit 215 and the luminance signal conversion unit 216, and sent to each of the liquid crystal drive units 213 and 214.

In step S27, the liquid crystal drive units 213 and 214 cause the liquid crystal units 204 and 205 to form images.

In step S28, the images formed by the liquid crystal units 204 and 205 are guided to the projection optical system 207 by light emitted from the light source 206, and the projection optical system 207 projects an image on the screen, not shown.

In step S29, the flicker sensor 224 starts flicker measurement.

In step S30, the flicker analysis unit 218 captures image data being displayed from the image processing unit 127, and averages luminances within the screen, to thereby extract a temporal fluctuation component of the image data. Further, the flicker analysis unit 218 cancels the fluctuation component of the image data from the fluctuation in the light quantity obtained by the flicker sensor 224, and extracts a flicker component.

In step S31, the flicker analysis unit 218 determines whether or not there is a flicker component in an output signal from the flicker sensor 224. When a there is a flicker component, the process proceeds to step S32, and when there is no flicker component, the process proceeds to step S35.

In the step S32, the flicker analysis unit 218 analyzes a flicker frequency. When the flicker frequency is in synchronization with the drive frequency of the liquid crystal display elements, the process proceeds to step S33, and when not, the process proceeds to step S37.

In the step S33, to identify whether or not flicker is caused by the light source, the flicker analysis unit 218 determines whether or not the same fluctuation is occurring synchronously in all the liquid crystal display elements. When the same fluctuation is detected in all the liquid crystal display elements, it can be determined that flicker is caused by the light source. In this case, the process proceeds to the step S37, and when not, the process proceeds to the step S34.

In the step S34, to reduce flicker caused by the liquid crystal display element, the flicker analysis unit 218 sends light quantity signals of the respective colors from the flicker sensor 224 to the liquid crystal drive unit 214. In response to the light quantity signals of the respective colors, the liquid crystal drive unit 214 drives the liquid crystal display elements of the liquid crystal unit 205 in opposite phase to fluctuations in light quantity. As a result, flicker caused by the liquid crystal display element is reduced. Alternatively, in response to fluctuations in light quantity caused by flicker, the liquid crystal drive unit 214 may dynamically control the opposing electrode voltage Vcom of the liquid crystal display elements of the liquid crystal unit 205.

In the step S35, when there is no power-off instruction, the process returns to the step S30. When a power-off instruction is given via the console 202, the process proceeds to step S36, in which the control unit 201 instructs the blocks to carry out end processing. Then, when preparations for ending are completed, the power source unit 203 sequentially ends supply of power to the blocks. After power-off, the cooling unit 231 operates for a while to cool the projection apparatus 200.

In the step S37, the control unit 201 causes the light source control unit 208 to control the quantity of light output from the light source 206 so that the quantity of light in the light source 206 can be maintained constant. That is, flicker caused by the light source is reduced. The process then proceeds to the step S35.

As described above, in the present embodiment, because the cause of flicker is determined based on the quantity of light having passed through the liquid crystal display elements, and no flicker sensor is used for the light source, the arrangement can be simplified. It is a matter of course that flicker reduction is provided according to the cause of flicker, flicker can be reduced without deteriorating display characteristics such as display contrast on the liquid crystal display elements.

A description will now be given of a projection apparatus according to a third embodiment. In the present embodiment, the type of flicker is determined using only a flicker sensor that receives an optical image to be projected.

Figure 9:
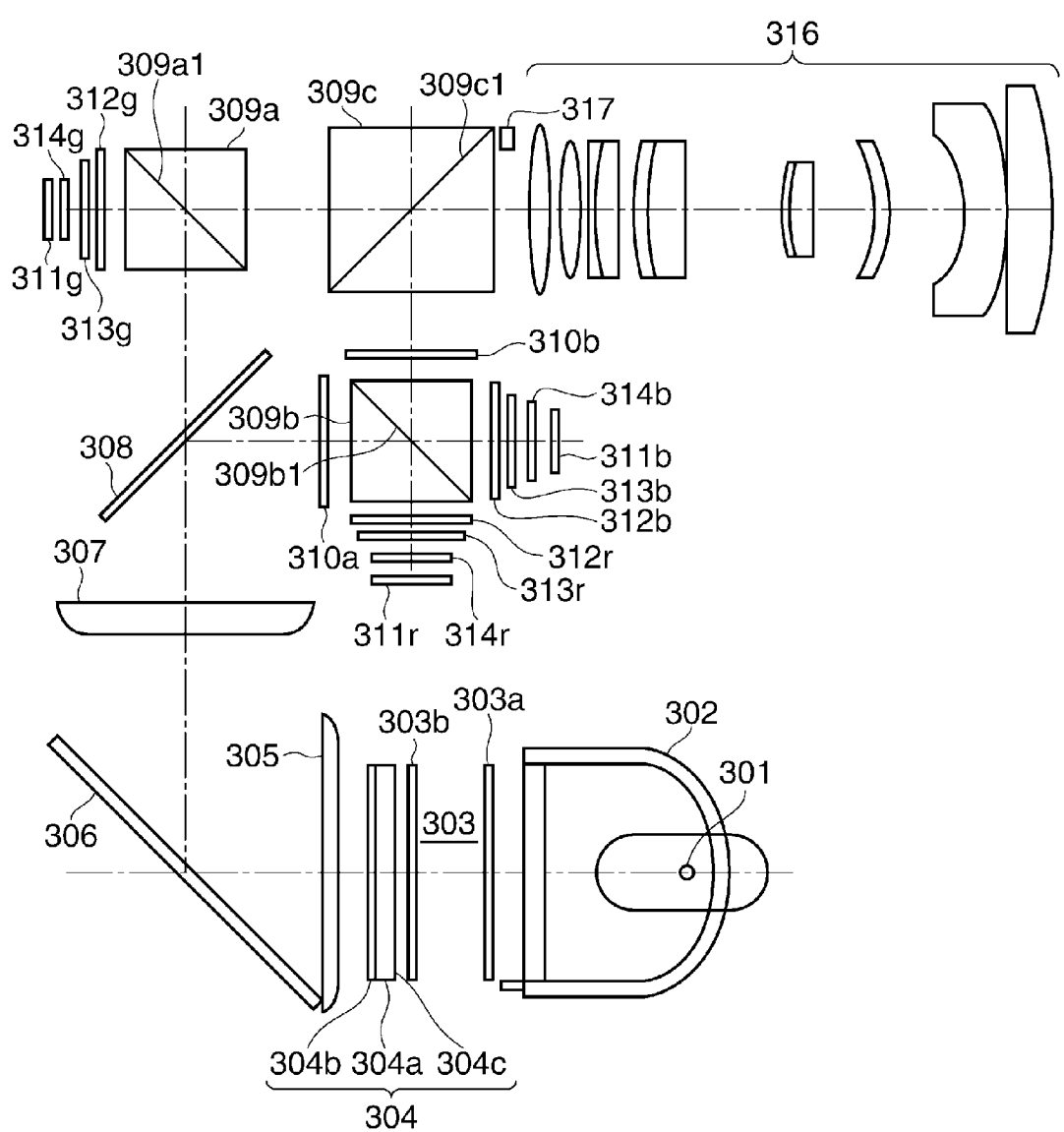
FIG. 9 is a diagram schematically showing an arrangement of an optical system of a projection apparatus according to a third embodiment.

FIG. 9 is a diagram schematically showing an arrangement of an optical system of the projection apparatus according to the third embodiment. Referring to FIG. 9, a light source 301 is comprised of a high-pressure mercury light source or the like. A reflector 302 radiates light in predetermined directions from the light source 301. An integrator 303 forms a light source region having a uniform light intensity, and is comprised of fly eye lenses 303a and 303b. A polarizing conversion element 304 align unpolarized light in a predetermined polarizing direction, and is comprised of a polarizing split film 304a, ½ wave plate 304b, and a reflective plate 304c.

A condenser lens 305 gathers source light. A reference numeral 6 designates a mirror. A field lens 307 renders source light telecentric. A dichroic mirror 308 passes light in a green wavelength range.

Polarizing beam splitters 309a, 309b, and 309c have polarizing split films 309a1, 309b1, and 309c1, respectively. The polarizing split films 309a1, 309b1, and 309c1 have the property of reflecting s-polarized light and passing p-polarized light.

Color-selective wave plates 310a and 310b change (rotate) 90 degrees the polarizing direction of light in a predetermined wavelength range. Liquid crystal display elements 311r, 311b, and 311b reflect incident source light and modulate the same in accordance with an image signal, thus forming image light. Reference numerals 312r, 312g, and 312b designate ¼ wave plates. Reference numerals 313r, 313g, and 313b designate uniaxial birefringent filters which are birefringent phase difference compensation elements each of which corrects for phase differences occurring when the liquid crystal display elements 311r, 311b, and 311b are producing displays in black. A reference numeral 316 designates a projector lens.

Luminance modulation liquid crystal display elements 314r, 314g, and 314b control luminance to respective colors, and is specifically comprised of a transmissive liquid crystal.

A flicker sensor 317 receives an optical image to be projected which has been obtained through synthesis by the polarizing beam splitter 309c.

A description will now be given of an optical action of the optical system in FIG. 9. Outgoing light from the light source 301 is gathered in a direction toward the fly eye lens 330a by the reflector 302. This light pencil is split into a plurality of light beams by the fly eye lens 303a. The plurality of light beams are superimposed on the liquid crystal display elements 311r, 311g, and 311b through action of the fly eye lens 303b, the condenser lens 305, and the field lens 307. A light source region having a uniform light intensity is formed on the liquid crystal display elements 311r, 311g, and 311b.

The plurality of light beams output from the fly eye lens 303b are split into p-polarized light and s-polarized light by the polarizing split film 304a corresponding to each light beam. The p-polarized light is converted into a polarized component in the same direction as the s-polarized light by the ½ wave plate 304b, and the s-polarized light is reflected by the reflective plate 304c. Thus, as light having predetermined polarizing directions, the plurality of light beams are output in the same direction from the fly eye lens 303b.

The light having been almost uniformly s-polarized by the polarizing conversion element 304 falls on the dichroic mirror 308 which passes green wavelength range light. The dichroic mirror 308 passes green wavelength range light, and reflects red and blue wavelength range light. The green wavelength range light passed through the dichroic mirror 308 is reflected on the polarizing split film 309a1 of the polarizing split film 309a to pass through the ¼ wave plate 312g. Further, the green wavelength range light passes through the birefringent filter 313g, and passes through the luminance modulation liquid crystal display element 314g, which controls luminance of each color, to fall on the liquid crystal display element 311g.

Of the red and blue wavelength range light reflected on the dichroic mirror 308, only the blue wavelength range light is turned into p-polarized light by the polarizing direction thereof being changed 90 degrees by the color-selective wave plate 310a, whereas the red wavelength range light which is s-polarized light falls as it is on the polarizing beam splitter 309b. The polarizing split film 309b1 of the polarizing beam splitter 309b passes the blue wavelength range light which is p-polarized light, and reflects the red wavelength range light which is s-polarized light. As a result, the light is split into the red and blue wavelength range light whose polarizing directions are perpendicular to each other.

The red wavelength range light reflected by the polarizing beam splitter 309b passes through the ¼ wave plate 312r. The red wavelength range light further passes through the birefringent filter 313r, and passes through the luminance modulation liquid crystal display element 314r, which controls luminance of each color, to fall on the liquid crystal display element 311r. The blue wavelength range light passed through by the polarizing beam splitter 309b passes through the ¼ wave plate 312b. The blue wavelength range light further passes through the birefringent filter 313b, and passes through the luminance modulation liquid crystal display element 314, which controls luminance of each color, to fall on the liquid crystal display element 311b.

The green wavelength range light modulated and reflected by the liquid crystal display element 311g passes through the luminance modulation liquid crystal display element 314g, which controls luminance of each color, the birefringent filter 313g, and the ¼ wave plate 312g to become p-polarized light, and passes through the polarizing beam splitters 309a and 309c.

The red wavelength range light modulated and reflected by the liquid crystal display element 311r passes through the luminance modulation liquid crystal display element 314r, which controls luminance of each color, the birefringent filter 313r and the ¼ wave plate 312r to become p-polarized light, and passes through the polarizing beam splitter 309b to fall on the color-selective wave plate 310b.

The blue wavelength range light modulated and reflected by the liquid crystal display element 311b passes through the luminance modulation liquid crystal display element 314b, which controls luminance of each color, and the birefringent filter 313b, and is converted to s-polarized light by the ¼ wave plate 312b. The blue wavelength range light which is s-polarized light is reflected by the polarizing beam splitter 309b to fall on the color-selective wave plate 310b.

Of the red wavelength range light and the blue wavelength range light that fall on the color-selective wave plate 310b, the red wavelength range light is turned into s-polarized light by the polarizing direction thereof being changed 90 degrees, whereas the blue wavelength range light which is s-polarized light passes as it is through the color-selective wave plate 310b. The polarizing beam splitter 309c reflects the red wavelength range light and the blue wavelength range light, both of which is s-polarized light, from the color-selective wave plate 310b.

The polarizing beam splitter 309c synthesizes the light in all the wavelength ranges of red, green, and blue, and supplies the synthesized light to the projector lens 316. The projector lens 316 projects the synthesized light onto a screen, not shown, or the like.

The flicker sensor 317, which is disposed on an output side of the polarizing beam splitter 309c, receives an optical image obtained through synthesis by the polarizing beam splitter 309c. The flicker sensor 317 detects a light quantity of the optical image to be projected including flicker caused by the liquid crystal display element and flicker caused by the light source, and generates an intensity signal corresponding to the light quantity.

Figure 10:
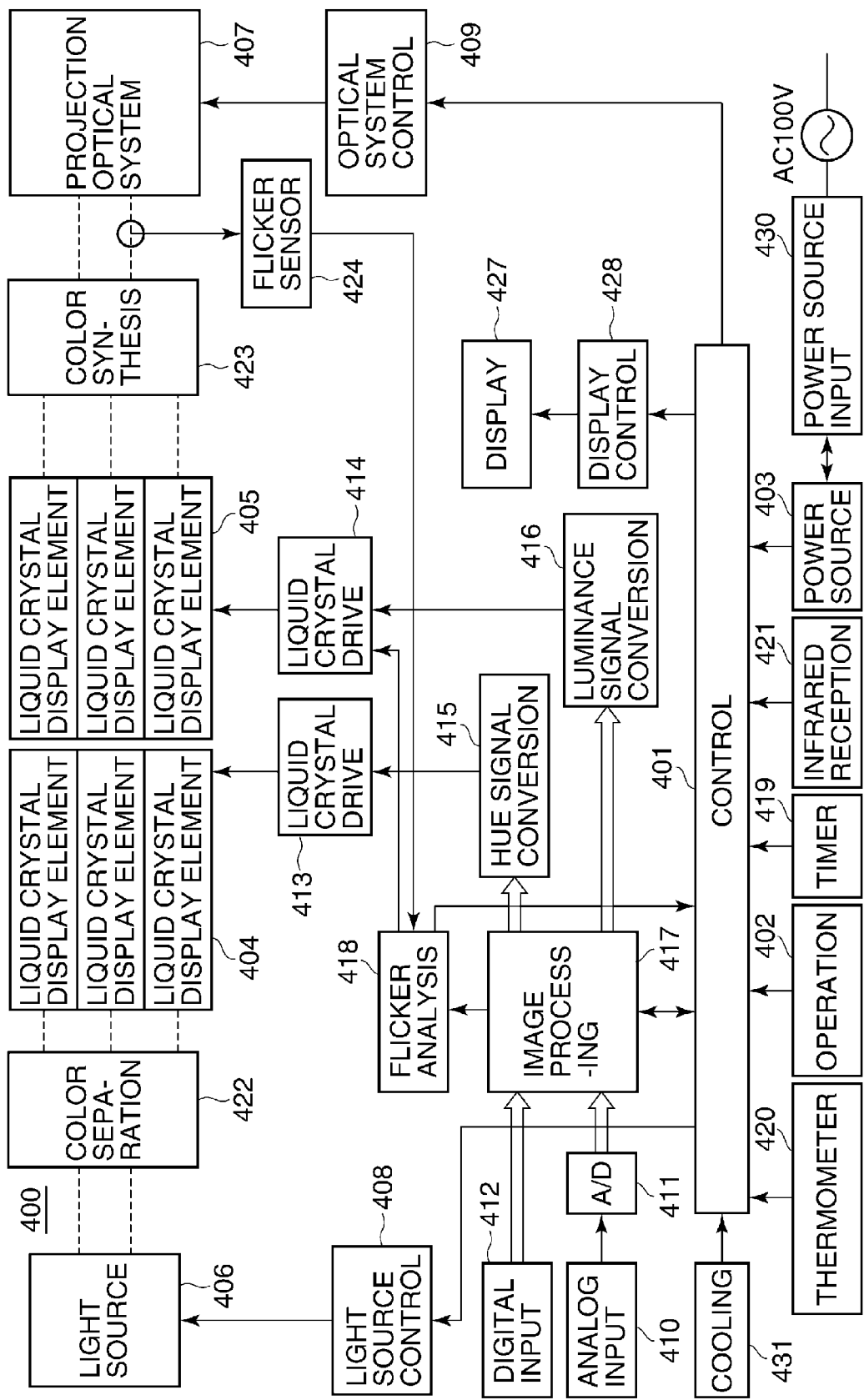
FIG. 10 is a block diagram schematically showing an arrangement of an electric system according to the present embodiment.

FIG. 10 is a block diagram schematically showing an arrangement of an electric system according to the present embodiment. A projection apparatus 400 is a projection apparatus according to the present embodiment. A control unit 401 controls blocks of the projection apparatus 400. A console 402 receives operations from the user. A power source unit 403 controls power supply to the blocks of the projection apparatus 400. A liquid crystal unit 404 displays a hue signal, and a liquid crystal unit 405 displays a luminance signal. The liquid crystal units 404 and 405 are each comprised of three liquid crystal display elements and others, and form images on the liquid crystal display elements.

A light source 406 supplies light to the liquid crystal unit 404. A projection optical system 407 projects an optical image, which is formed by supplying light emitted from the light source 406 to the liquid crystal units 404 and 405, onto a screen, not shown. The projection optical system 407 corresponds to the projector lens 316 appearing in FIG. 9. A light source control unit 408 controls the light quantity or the like of light beams including the light source 406. An optical system control unit 409 controls a zoom lens, a focus lens, and so on of the projection optical system 407, and controls zoom rate and focus.

An analog input unit 410 receives an analog video signal from a PC (personal computer), a DVD reproducer, a television tuner, or the like, and is comprised of an RGB terminal, an S terminal, and so on. An A/D conversion unit 411 converts the analog video signal, which is obtained from the analog input unit 410, to a digital signal. The video signal converted to the digital signal by the A/D conversion unit 411 is supplied to an image processing unit 417. A digital input unit 412 accepts a digital video signal from a PC, a DVD reproducer, or the like, and is comprised of an HDMI terminal and others. When the digital input unit 412 is an HDMI terminal, a control signal may also be sent from outside at the same time, and image control or the like may be carried out based on this control signal.

The image processing unit 417 carries out processes such as color correction and image quality correction on video signals input to the analog input unit 410 and the digital input unit 412, video signals from the control unit 401, and so on to generate an RGB video signal. A hue signal conversion unit 415 generates a hue signal from the RGB video signal generated by the image processing unit 417. A luminance signal conversion unit 416 generates a luminance signal from the RGB video signal generated by the image processing unit 417.

In accordance with image signals from the hue signal conversion unit 415 and the luminance signal conversion unit 416, liquid crystal drive units 413 and 414 drive the liquid crystal display elements of the liquid crystal units 404 and 405 to form images.

A timer 419 detects an operating time of the projection apparatus 400, an operating time of each block, and so on. A thermometer 420 measures temperature of the light source 406 and temperature of the liquid crystal units 404 and 405 of the projection apparatus 400, external temperature, and so on. An infrared receiving unit 421 receives infrared rays from a remote control attached to the projection apparatus 400 and other devices, and sends them to the control unit 401. The infrared receiving unit 421 may be disposed, for example, at a plurality of points in the longitudinal direction of the projection apparatus 400.

A split optical unit 422 splits light output from the light source 406 into three RGB colors. The light of the three colors split by the split optical unit 422 passes through the liquid crystal units 404 and 405, and is synthesized by a color synthesizing unit 423 and projected from the projection optical system 407. A flicker sensor 424 measures the light quantities of light beams which has been synthesized by the color synthesizing unit 423, and corresponds to the flicker sensor 314. The flicker sensor 424 includes a light diffuser plate and others, and optically detects averages of the light quantities of light beams at measurement points.

A flicker analysis unit 418 analyzes an output signal from the flicker sensor 424 to distinguish whether flicker caused by the light source or flicker caused by the liquid crystal display element is occurring.

For flicker caused by the liquid crystal display element, it is necessary to extract a flicker component after canceling fluctuations in the light quantity of projection image data itself when a normal image is projected. Thus, the flicker analysis unit 418 captures image data from the image processing unit 417, averages the image data, and extracts a fluctuation component of the image data itself. Then, the flicker analysis unit 418 extracts a fluctuation component of a projection image itself from the light quantity obtained by the flicker sensor 424. Alternatively, there may be a flicker measurement mode in which a specific image pattern having a uniform tone with no temporal change for all three colors is displayed. In this state, the flicker sensor 424 detects the quantity of light, and the flicker analysis unit 418 extracts a flicker component of the image pattern.

A display unit 427, which is provided in the projection apparatus 400, displays conditions of the projection apparatus 400, warnings, and so on. A display control unit 428 controls the display unit 427. A power input unit 430 receives alternating-current power from outside, rectifies the power to a predetermined voltage, and supplies the rectified power to the power source unit 403. A cooling unit 431 cools the projection apparatus 400 by releasing heat in the projection apparatus 400 to outside, and is comprised of, for example, a heat sink and a fan.

The flicker sensor 424 and the flicker analysis unit 418 have, for example, arrangements shown in FIG. 7. It should be noted that among light quantity signals from the flicker sensor 424, the frequency of a fluctuation in light quantity after a fluctuation in a projection image is canceled is equal to the update drive frequency of the liquid crystal display elements, it can be estimated that flicker is occurring in the liquid crystal display elements. Similarly, when a fluctuation in light quantity after a fluctuation in a projection image is canceled is in synchronization with the update drive frequency of the liquid crystal display elements, it can be estimated that flicker is occurring in the liquid crystal display elements.

A description will now be given of normal operations of the projection apparatus 400. In response to a power-on instruction from the console 402, the control unit 401 instructs the power source unit 403 to supply power to each block, thus bringing each block into standby state. When power is turned on, the control unit 401 instructs the light source control unit 408 to start light emission from the light source 406.

Based on information such as instructions input from the console 402, the control unit 401 instructs the optical system control unit 409 to make adjustments to the projection optical system 407. The optical system control unit 409 causes the zoom lens and the focus lens of the projection optical system 407 to operate so that projection light can form an image on the screen. At this time point, preparations for projection are completed.

A video signal input to the digital input unit 412 is converted to a resolution suitable for the liquid crystal units 404 and 405, and subjected to gamma correction, luminance nonuniformity correction, and keystone correction by the image processing unit 417. Then, a luminance component of the video signal corrected by the image processing unit 417 is supplied to the liquid crystal drive unit 414 via the luminance signal conversion unit 416, and a hue signal is supplied to the liquid crystal drive unit 413 via the hue signal conversion unit 415. The liquid crystal drive units 413 and 414 drive the respective liquid crystal units 404 and 405 according to the respective input signals to form images.

Light emitted from the light source 406 is spatially intensity-modulated by the images formed by the liquid crystal display elements of the liquid crystal units 404 and 405, and projected onto a screen, not shown, by the projection optical system 407.

The flicker sensor 424 continues measuring the light quantity during the projection, and the flicker analysis unit 418 analyzes the cause, presence or absence, and extent of flicker. When flicker is caused by the light source 406, the control unit 401 causes the light source control unit 408 to control electrical power supplied to the power source 406 so that flicker caused by the light source can be reduced. An aperture may be provided in an output stage of the light source 406, and the degree of opening of this aperture may be controlled in opposite phase to flicker. As a means for reducing flicker caused by the light source, all the liquid crystal display elements may be driven in opposite phase and in synchronization with flicker, and their intensities may be controlled so as to cancel out flicker.

When flicker is caused by the liquid crystal display element, the flicker analysis unit 418 controls the liquid crystal display elements of the liquid crystal unit 405, to thereby reduce flicker caused by the liquid crystal display element. Specifically, the flicker analysis unit 418 supplies light quantity signals of the respective colors from the flicker sensor 424 to liquid crystal drive unit 414. In response to the light quantity signals from the flicker analysis unit 418, the liquid crystal drive unit 414 drives the liquid crystal display elements of the liquid crystal unit 405 in opposite phase to fluctuations in the light quantity due to flicker. By driving the liquid crystal display elements in opposite phase, flicker caused by the liquid crystal display element can be reduced. Alternatively, in response to fluctuations in light quantity caused by flicker, the liquid crystal drive unit 414 may dynamically control the opposing electrode voltage Vcom of the liquid crystal display elements.

During the projection, the control unit 401 detects temperatures of the light source 406 and others using the thermometer 420, and for example, when the temperature of the light source 406 becomes equal to or higher than a predetermined temperature, the control unit 401 causes the cooling unit 431 to cool the light source 406.

When a power-off instruction is given through the console 402, the control unit 401 instructs the blocks to carry out end processing. When preparations for ending are completed, the power supply unit 403 sequentially stops power supply to the blocks. After the power is turned off, the cooling unit 431 operates for a while to cool the projection apparatus 400.

Although the case where a video signal input from the digital input unit 412 is displayed has been described, the same holds for a case where an input image from the analog input unit 410 is displayed.

Figure 11A:
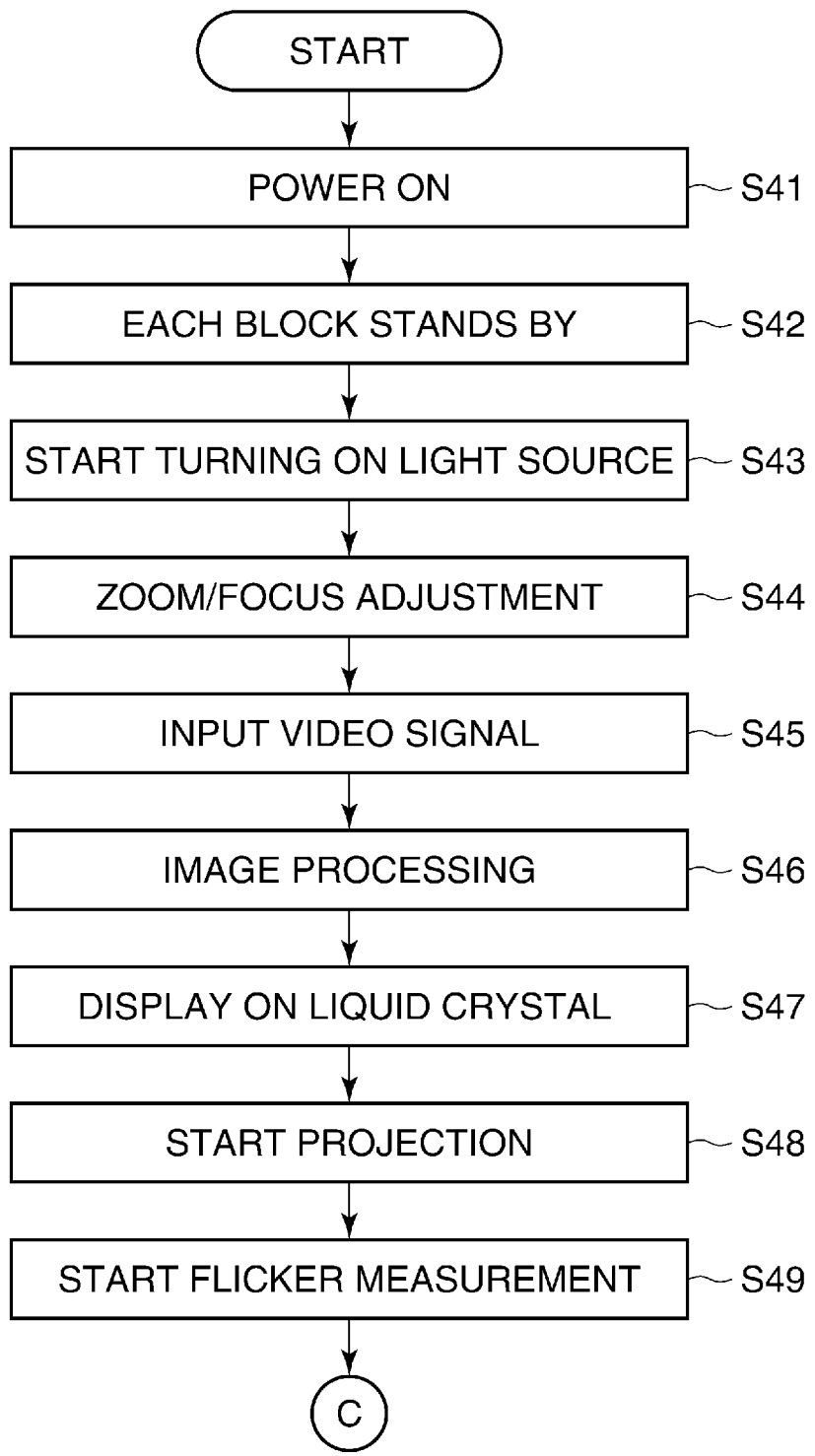

FIGS. 11A and 11B are flowcharts of a characteristic operation according to the present embodiment. Referring to FIGS. 11A and 11B, a description will be given of a flicker reduction operation according to the present embodiment.

In step S41, the power to the projection apparatus 400 is turned on.

In step S42, in response to a power-on instruction given through the console 402, the control unit 401 instructs the power source unit 403 to supply power to each block, thus bringing each block into standby state.

After power is turned on in step S43, the control unit 401 instructs the light source control unit 408 to start light emission from the light source 406.

In step S44, based on information such as instructions input from the console 402, the control unit 401 instructs the light source control unit 409 to make adjustments to the projection optical system 407. The optical system control unit 409 causes the zoom lens and the focus lens of the projection optical system 407 to operate so that projection light can form an image on the screen. Thus, preparations for projection are completed.

In step S45, a video signal is input to the digital input unit 412 or the analog input unit 410.

In step S46, the image processing unit 417 converts the input video signal to a resolution suitable for the liquid crystal units 404 and 405, and subjects the input video signal to gamma correction, luminance nonuniformity correction, and keystone correction. Then, the video signal corrected by the image processing unit 417 is input to and processed by the hue signal conversion unit 415 and the luminance signal conversion unit 416, and sent to each of the liquid crystal drive units 413 and 414.

In step S47, the liquid crystal drive units 413 and 414 cause the liquid crystal units 404 and 405 to form images.

In step S48, the images formed by the liquid crystal units 404 and 405 are guided to the projection optical system 407 by light emitted from the light source 406, and the projection optical system 407 projects an image onto the screen, not shown.

In step S49, the flicker sensor 424 starts flicker measurement.

In step S50, the flicker sensor 424 measures light quantity, and the flicker analysis unit 418 captures image data being displayed from the image processing unit 127, and averages luminances within the screen, to thereby extract a temporal fluctuation component of the image data. Further, the flicker analysis unit 418 cancels the fluctuation component of the image data from a fluctuation in light quantity obtained by the flicker sensor 424, and extracts a frequency component of the fluctuation in light quantity.

In step S51, the flicker analysis unit 418 determines whether or not there is a flicker component in an output signal from the flicker sensor 424. When there is a flicker component, the process proceeds to step S52, and when there is no flicker component, the process proceeds to step S56.

In the step S52, the flicker analysis unit 418 analyzes a flicker frequency. When the flicker frequency corresponds to or is in synchronization with the drive frequency of the liquid crystal display elements, the process proceeds to step S54, and when not, the process proceeds to step S53. In the step S54, the flicker analysis unit 418 determines whether or not flicker can be controlled through the liquid crystal display elements.

In the present embodiment, because the quantity of light after color synthesis is measured, flicker caused by the light source being in synchronization with operation of the liquid crystal display elements may be falsely detected although this is less likely. In view of this, first, sorting is done according to flicker frequencies, and then, by way of precaution, it is checked whether or not flicker can be reduced through the liquid crystal display elements. Specifically, it is taken into consideration that even flicker caused by the light source may be in synchronization with the liquid crystal display elements for some reason such as operation of the liquid crystal display elements.

In the step S54, when it is determined that flicker can be reduced through the liquid crystal display elements, the process proceeds to step S55, and when not, it is determined that flicker is caused by the light source, and the process proceeds to the step S53.

In the step S53, the control unit 401 causes the light source control unit 408 to control the quantity of light output from the light source 406 so that the quantity of light in the light source 406 can be made constant. That is, flicker caused by the light source is reduced. The process then proceeds to the step S56.

In the step S55, to reduce flicker caused by the liquid crystal display element, the flicker analysis unit 418 sends light quantity signals from the flicker sensor 424 to the liquid crystal drive unit 414. In response to fluctuations in light quantity indicated by signals from the flicker analysis unit 418, the liquid crystal drive unit 414 may dynamically control the opposing electrode voltage Vcom of the liquid crystal display elements of the liquid crystal unit 405.

In the step S56, when there is no power-off instruction, the process returns to the step S50. When a power-off instruction is given via the console 402, the process proceeds to step S57, in which the control unit 401 instructs the blocks to carry out end processing. Then, when preparations for ending are completed, the power source unit 403 sequentially ends power supply to the blocks. After power-off, the cooling unit 431 operates for a while to cool the projection apparatus 400.

As described above, in the present embodiment, because the cause of flicker is determined using only the flicker sensor that measures the quantity of image light to be projected, the arrangement can be simplified. It is a matter of course that because flicker reduction is provided according to the cause of flicker, flicker can be reduced without deteriorating display characteristics such as display contrast on the liquid crystal display elements.

Other Embodiments

Aspects of the embodiments can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-120894 filed May 26, 2010, which is hereby incorporated by reference herein in its entirety.

What is claimed is:

1. A projection apparatus that displays a projection image on a projection surface, comprising:
   a light source unit configured to output light for projecting the projection image;
   a color separation unit configured to separate the light output from the light source unit into light beams of a plurality of colors;
   a plurality of display units configured to form images corresponding to the light beams of the plurality of colors;
   a color synthesis unit configured to synthesize the light beams of the plurality of colors having passed through the plurality of display units;
   a projection unit configured to project light obtained through synthesis by the color synthesis unit onto the projection surface;
   a plurality of detection units configured to detect fluctuations in light quantity of the light beams of the plurality of colors having passed through the plurality of display units and yet to be input to the color synthesis unit; and
   a determination unit configured to analyze detection results obtained by the plurality of detection units, and determine whether flicker caused by the plurality of display units or flicker caused by the light source unit is occurring in the projection image,
   wherein the determination unit determines whether flicker caused by the plurality of display units or flicker caused by the light source unit is occurring by comparing respective frequencies of the fluctuations in the light quantity of the light beams of the plurality of colors detected by the plurality of detection units.

2. The projection apparatus according to claim 1, further comprising a reduction unit configured to reduce flicker caused by the plurality of display units or flicker caused by the light source unit.

3. The projection apparatus according to claim 1, wherein the plurality of detection units are disposed so as to detect light other than light of the projection image projected onto the projection surface.

4. The projection apparatus according to claim 2, wherein the reduction unit reduces flicker by modulating luminances of the respective light beams of the plurality of colors.

5. The projection apparatus according to claim 2, wherein the reduction unit comprises liquid crystal elements modulating luminances of respective light beams of the plurality of colors.

6. The projection apparatus according to claim 2, wherein the reduction unit comprises a light source control unit configured to make a quantity of light output from the light source unit constant.

7. A projection apparatus that displays a projection image on a projection surface, comprising:
   a light source unit configured to output light for projecting the projection image;
   a color separation unit configured to separate the light output from the light source unit into light beams of a plurality of colors;
   a plurality of display units configured to form images corresponding to the light beams of the plurality of colors;
   a color synthesis unit configured to synthesize the light beams of the plurality of colors having passed through the plurality of display units;
   a projection unit configured to project light obtained through synthesis by the color synthesis unit onto the projection surface;
   a detection unit configured to detect a fluctuation in light quantity of the light having passed through the color synthesis unit; and
   a determination unit configured to analyze a detection result obtained by the detection unit, and determine whether flicker caused by the plurality of display units or flicker caused by the light source unit is occurring in the projection image,
   wherein the determination unit determines whether flicker caused by the plurality of display units or flicker caused by the light source unit is occurring by determining whether a frequency of fluctuation in the light quantity of the light detected by the detection unit and a drive frequency of the plurality of display units are in synchronization with each other.

8. The projection apparatus according to claim 7, further comprising a reduction unit configured to reduce flicker caused by the plurality of display units or flicker caused by the light source unit.

9. The projection apparatus according to claim 7, wherein the detection unit is disposed so as to detect light other than light of the projection image projected onto the projection surface.

10. A projection apparatus that displays a projection image on a projection surface, comprising:
    a light source unit configured to output light for projecting the projection image;
    a color separation unit configured to separate the light output from the light source unit into light beams of a plurality of colors;
    a plurality of display units configured to form images corresponding to the light beams of the plurality of colors;
    a color synthesis unit configured to synthesize the light beams of the plurality of colors having passed through the plurality of display units;
    a projection unit configured to project light obtained through synthesis by the color synthesis unit onto the projection surface;
    a detection unit configured to detect a fluctuation in light quantity of the light having passed through the color synthesis unit; and
    a reduction unit configured to analyze a detection result obtained by the detection unit, and reduce flicker caused by the plurality of display units or flicker caused by the light source unit, which is occurring in the projection image,
    wherein the reduction unit analyzes a detection result obtained by the detection unit, and when flicker is occurring in the projection image, reduces flicker caused by the plurality of display units, and analyzes again a detection result obtained by the detection unit, and when flicker is further occurring in the projection image, reduces flicker caused by the light source unit.

11. The projection apparatus according to claim 8, wherein the reduction unit reduces flicker by modulating luminances of the respective light beams of the plurality of colors.

12. The projection apparatus according to claim 8, wherein the reduction unit comprises a liquid crystal element configured to modulate luminances of the respective light beams of the plurality of colors.

13. The projection apparatus according to claim 8, wherein the reduction unit comprises a light source control unit configured to make a quantity of light output from the light source unit constant.

14. The projection apparatus according to claim 1, wherein regarding the respective frequencies of the fluctuations in the light quantity of the light beams of the plurality of colors detected by the plurality of detection units, when the same fluctuation is detected in all the plurality of display units, the determination unit determines that flicker caused by the light source unit is occurring.

* * * * *